(12) United States Patent
Eftekhari et al.

(10) Patent No.: US 8,204,805 B2
(45) Date of Patent: Jun. 19, 2012

(54) INSTANT TAX RETURN PREPARATION

(75) Inventors: Amir R. Eftekhari, San Diego, CA (US); Erikheath A. Thomas, Lincoln, NE (US); Carol Ann Howe, San Diego, CA (US); George Thomas Ericksen, San Diego, CA (US); Gerald Baron Huff, Berkeley, CA (US); Gang Wang, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 104 days.

(21) Appl. No.: 12/914,902

(22) Filed: Oct. 28, 2010

(65) Prior Publication Data

US 2012/0109792 A1    May 3, 2012

(51) Int. Cl.
*G06F 17/22* (2006.01)
(52) U.S. Cl. ............. 705/31; 705/19; 705/30; 705/36 T; 705/43; 715/277; 715/745; 715/783
(58) Field of Classification Search .......................... None
See application file for complete search history.

(56) References Cited

U.S. PATENT DOCUMENTS

| | | | |
|---|---|---|---|
| 4,553,261 A | 11/1985 | Froessl | |
| 4,890,228 A | 12/1989 | Longfield | |
| 5,138,549 A | 8/1992 | Bern | |
| 5,193,057 A | 3/1993 | Longfield | |
| 5,644,724 A | 7/1997 | Cretzler | |
| 5,724,523 A | 3/1998 | Longfield | |
| 5,774,872 A | 6/1998 | Golden et al. | |
| 5,875,433 A | 2/1999 | Francisco et al. | |
| 5,909,794 A | 6/1999 | Molbak et al. | |
| 5,963,921 A | 10/1999 | Longfield | |
| 6,032,137 A | 2/2000 | Ballard | |
| 6,078,898 A * | 6/2000 | Davis et al. | 705/19 |
| 6,078,924 A | 6/2000 | Ainsbury et al. | |
| 6,202,052 B1 * | 3/2001 | Miller | 705/31 |
| 6,473,741 B1 | 10/2002 | Baker | |
| 6,601,044 B1 | 7/2003 | Wallman | |
| 6,697,787 B1 * | 2/2004 | Miller | 705/31 |
| 6,823,478 B1 | 11/2004 | Prologo et al. | |
| 6,850,950 B1 | 2/2005 | Clarke et al. | |
| 7,117,374 B2 | 10/2006 | Hill et al. | |
| 7,548,885 B2 * | 6/2009 | Dutta et al. | 705/43 |
| 7,610,227 B2 | 10/2009 | Wyle | |

(Continued)

OTHER PUBLICATIONS

"Taxware (R) Enhances Functionality of Sales/Use Tax System with Interface to PaperVision (R) Enterprise Software for Document Management", PR Newswire Jun. 17, 2003, Business Dateline, 3 pages.

(Continued)

*Primary Examiner* — Ryan Zeender
*Assistant Examiner* — Fateh Obaid
(74) *Attorney, Agent, or Firm* — Osha • Liang LLP

(57) ABSTRACT

A method involves generating a partially completed tax return based on basic user information without needing to obtain other user inputs through an extensive user interview. A list of simple and concise interview questions are generated or selected from an interview question collection based on the partially completed tax return to finalize the tax return. The method further involves using an inference engine to allow data collection at any time and in any order via specific, personalized questions geared toward completion of the tax return. Therefore the taxpayer spends time reviewing rather than preparing his or her tax documents.

33 Claims, 15 Drawing Sheets

U.S. PATENT DOCUMENTS

| | | | |
|---|---|---|---|
| 7,636,886 B2 * | 12/2009 | Wyle et al. .................... 715/277 |
| 7,668,763 B1 | 2/2010 | Albrecht |
| 7,707,153 B1 * | 4/2010 | Petito et al. ............ 707/999.101 |
| 7,747,484 B2 * | 6/2010 | Stanley et al. ................... 705/31 |
| 7,769,645 B1 * | 8/2010 | Albrecht ......................... 705/31 |
| 7,853,494 B2 * | 12/2010 | Wyle ............................... 705/31 |
| 7,930,226 B1 * | 4/2011 | Quinn et al. .................... 705/31 |
| 8,001,021 B1 * | 8/2011 | Quinn et al. .................... 705/31 |
| 8,024,660 B1 * | 9/2011 | Quinn et al. .................. 715/745 |
| 2001/0037268 A1 * | 11/2001 | Miller ............................. 705/31 |
| 2002/0111888 A1 | 8/2002 | Stanley et al. |
| 2003/0097324 A1 * | 5/2003 | Speckman ...................... 705/36 |
| 2004/0177013 A1 * | 9/2004 | Zhou ............................... 705/30 |
| 2004/0243489 A1 * | 12/2004 | Mitchell et al. ................. 705/30 |
| 2005/0004885 A1 | 1/2005 | Pandian et al. |
| 2005/0165780 A1 | 7/2005 | Omega et al. |
| 2005/0203970 A1 | 9/2005 | McKeown et al. |
| 2006/0026083 A1 * | 2/2006 | Wyle ............................... 705/31 |
| 2006/0080305 A1 | 4/2006 | Dill et al. |
| 2006/0155618 A1 * | 7/2006 | Wyle ............................... 705/31 |
| 2007/0027894 A1 | 2/2007 | Bridges et al. |
| 2007/0260974 A1 | 11/2007 | Hauser |
| 2007/0299772 A1 * | 12/2007 | Mastie et al. ................... 705/39 |
| 2008/0133295 A1 * | 6/2008 | Cappel et al. ..................... 705/7 |
| 2009/0180136 A1 | 7/2009 | Teranishi |
| 2010/0217694 A1 * | 8/2010 | Knighton ........................ 705/31 |

OTHER PUBLICATIONS

Office Action in Application No. 2,420,481, Canadian Intellectual Property Office, May 31, 2006, 6 pages.

"H&R Block and NetZero Offer Consumers Fast, Accurate Online Tax Preparation and Filing", United Online Press Release, Mar. 28, 2000 (http://irconnect.com/untd/pages/news_releases.html?d=16829), 2 pages.

"Microsoft and Block Financial Help Consumers Ease the Pain of Tax Season", Microsoft PressPass, Jan. 7, 1998, (http://www.microsoft.com/presspass/press/1998/jan98/kipingpr.mspx), 3 pages.

"Backup Powers Online Data Protection Service for Quicken TurboTax Users", Gale Group New Product Announcement, Jan. 17, 2000, 2 pages.

International Search Report from PCT/US01/26182, dated Aug. 21, 2001, 7 pages.

"Internet Access: Intuit to Provide Internet Access Directly from Quicken", Gale Group Newsletter, vol. 6, No. 283. Oct. 23, 1995, 6 pages.

Kelly, D., "MacinTax Final Version Releases Earlier than Ever", Business Dateline, Jan. 1, 1993, 3 pages.

"Open Financial Exchange", Specification 2.0, 2000 Intuit Inc., Microsoft Corporation, Apr. 1, 2000, 538 pages.

"Quicken Turbo Tax Deluxe: User's Guide TurboTax Deluxe—Tax Year 1999", Jan. 1999, 32 pages.

"TurboTax: The Easiest Way to Do Your Taxes User's Guide for Windows 95 and Windows 3.1", Tax Year 1995, Jan. 1995, 58 pages.

* cited by examiner

Basic Information Screenshot
355

Welcome to TurboTax Instant Return

In order to pull together your Instant Return, we need to gather some basic information.

First Name
Last Name
Social Security Number

Data Entry Fields A
356

Next  Verify My Identity

Action Button A
357

Identity Confirmation Screenshot
358

We have located Your Information

Thank you, Gerald. We now need to confirm your identity.

We are going to ask for some information that only you would know, based on private tax information we have gathered on your behalf.

Please enter your Date of Birth
Please enter your Zip Code
Please enter your telephone number Data Entry Fields B
359

Next  Confirm My Tax Information

Action Button B
360

FIG. 3B

Without Inference

With Inference

INSTANT TAX RETURN PREPARATION

CROSS REFERENCE TO RELATED APPLICATIONS

This application is related to co-pending U.S. patent application Ser. No. 11/491,645, filed on Jul. 24, 2006, and entitled "USER-DRIVEN DOCUMENT-BASED DATA COLLECTION," also assigned to the assignee of the present application and incorporated herein by reference.

BACKGROUND

Taxes are a complicated part of everyone's lives. In fact, taxes have become so complicated that the vast majority of taxpayers turn to a professional accountant, a tax preparation software program, or both to prepare and file the taxpayer's tax return. Professional accountants offer detailed, personalized information, and advice, but can be very expensive. Tax preparation software programs, while cheaper than professional accountants, generally tend to ask each user the exact same questions and provide no detailed, personalized information or advice to the user.

SUMMARY

In general, in one aspect, the invention relates to a method for preparing a tax return for a user. The method includes (I) collecting tax data items without user intervention by (i) identifying, using a processor of a computer system and by applying a plurality of inference rules based on information of the user, a first document and an entity configured to maintain the first document, (ii) identifying an access mechanism for accessing the first document from the entity and obtaining a downloaded copy of the first document based on the access mechanism, (iii) retrieving, using the processor, a first tax data item from the first document by applying the plurality of inference rules based on the downloaded copy, (iv) obtaining a scanned image of a second document, and (v) retrieving, using the processor, a second tax data item from the second document by applying the plurality of inference rules based on the scanned image, (II) generating, using the processor, a partially completed tax return by populating a tax form of the tax return using the first and second tax data items and calculating a preliminary tax liability therefrom, and (III) displaying the partially completed tax return comprising the preliminary tax liability to the user.

In general, in one aspect, the invention relates to a system for preparing a tax return for a user. The system includes (I) a memory and a processor, operatively connected to the memory, (II) a tax inference engine executing on the processor and configured to identify, by applying a plurality of inference rules based on information of the user, a first document and an entity configured to maintain the first document, receive a downloaded copy of the first document, retrieve a first tax data item from the first document by applying the plurality of inference rules based on the downloaded copy, receive a scanned image of a second document, and retrieve a second tax data item from the second document by applying the plurality of inference rules based on the scanned image, (III) a data import service executing on the processor and configured to identify access mechanism for accessing the first document from the entity, obtain the downloaded copy of the first document based on the access mechanism for sending to the tax inference engine, and obtain the scanned image of the second document for sending to the tax inference engine, and (IV) a tax preparation application executing on the processor and configured to generate a partially completed tax return by populating a tax form of the tax return using the first and second tax data items and calculating a preliminary tax liability therefrom, and display the partially completed tax return comprising the preliminary tax liability to the user.

In general, in one aspect, the invention relates to a computer readable storage medium storing computer executable instructions for preparing a tax return for a user. The instructions when executed by a processor include functionality for (I) collecting tax data items without user intervention by (i) identifying, by applying a plurality of inference rules based on information of the user, a first document and an entity configured to maintain the first document, (ii) identifying an access mechanism for accessing the first document from the entity and obtaining a downloaded copy of the first document based on the access mechanism, (iii) retrieving a first tax data item from the first document by applying the plurality of inference rules based on the downloaded copy, (iv) obtaining a scanned image of a second document, and (v) retrieving a second tax data item from the second document by applying the plurality of inference rules based on the scanned image, (II) generating a partially completed tax return by populating a tax form of the tax return using the first and second tax data items and calculating a preliminary tax liability therefrom, and (III) displaying the partially completed tax return comprising the preliminary tax liability to the user.

Other aspects of the invention will be apparent from the following detailed description and the appended claims.

BRIEF DESCRIPTION OF DRAWINGS

FIGS. 3A through 3G show examples of generating a partially completed tax return in accordance with one or more embodiments of the invention.

DETAILED DESCRIPTION

Figure 1:
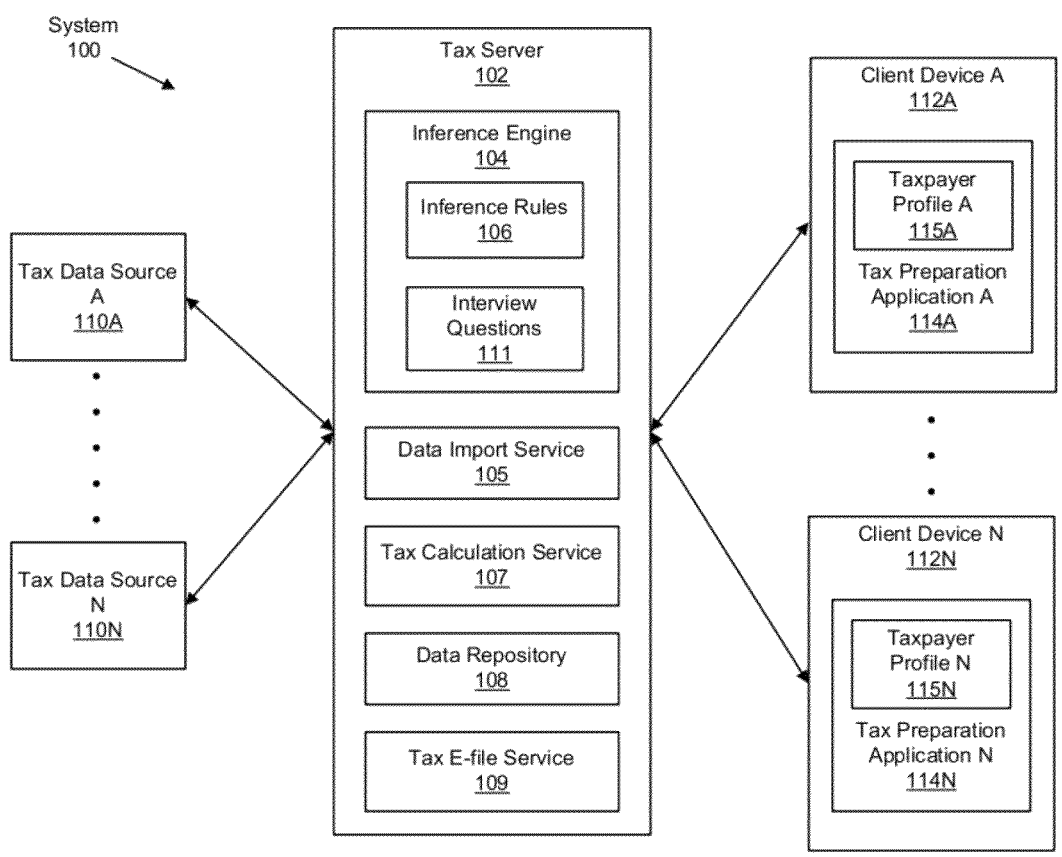
FIG. 1 shows a flow diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Generally speaking, embodiments of the invention provide for a system and method of generating a partially completed tax return based on basic user information provided by a user or stored in a user profile without needing to obtain other user inputs through an extensive user interview. A list of simple and concise interview questions are then generated or selected from an interview question collection based on the partially completed tax return to finalize preparation of the tax return.

Further, embodiments of the invention provide for a system and method of completing the tax return using an inference engine. Specifically, the system and method allow for data collection at any time and in any order, relieve the taxpayer from performing a majority of the work, provide personalized advice, and ask specific, personalized questions geared toward completion of the tax return. These features enable a taxpayer to merely spend time reviewing his or her tax documents, rather than preparing his or her tax documents.

Throughout the following detailed description, the terms "tax return" and "return", "user" and "taxpayer", as well as the terms "user profile" and "taxpayer profile" may be used interchangeably depending on context. In one or more embodiments of the invention, the "user" of the system may be the same as the "taxpayer." Alternatively, the "user" of the system maybe different from the "taxpayer" where the user is an agent of the taxpayer or someone performing all or a portion of the method or system on behalf of the taxpayer.

In one or more embodiments, the tax return is generated by automatically pre-populating the return with taxpayer data without user intervention before the user starts to work on the return. For example, in November or December, the user would provide basic information about the taxpayer, such as employer, home ownership, etc. The required documents for preparing the tax return is determined using the inference engine and the access credentials for such documents are obtained from the user to obtain the documents (e.g., W-2, mortgage interest report, stock trade account statements, etc.). In particular, authorizations in conjunction with the optional access credentials are provided by the taxpayer to retrieve data electronically from various sources on the taxpayer's behalf. A partially completed tax return (e.g., 50-75 percent complete compared to a finalized and filed tax return) is then prepared based on the obtained documents and presented to the user for verification and to obtain additional information needed to complete the tax return. The partially prepared return is then completed based on the user's verification and answers to follow-up interview questions.

In one or more embodiments of the invention, the aforementioned basic information and access credentials are stored in a taxpayer profile for preparing a tax return for a subsequent tax year such that the user does not need to provide them each time the inference engine needs to collect data on behalf of the taxpayer. Specifically, required data is automatically collected to create a partially completed return pro-actively in the subsequent tax year during the tax season. Throughout this disclosure, the term "partially completed tax return" refers to partially completed tax forms (e.g., IRS forms 1040, 1040EZ, schedule A, California forms 510, 510E, etc.) of a taxpayer's tax return. Specifically, these partially completed tax forms are pre-populated using automatically retrieved tax data items from financial institutions and government entities based on taxpayer profile. Further, these partially completed tax forms are pre-populated prior to engaging the user in an interview session and/or receiving user manual data entry inputs. As a result, the partially completed tax return is not in a condition for submitting to the tax entities until validated by the user. In particular, although a tax form typically includes data entry fields that are not applicable to all taxpayers and therefore remain un-populated for a particular taxpayer's tax return when finalized and filed with a tax entity, the term "partially completed" does not refer to a tax form having such un-populated data entry fields that are not applicable. Specifically, the term "partially completed" refers to one or more tax forms having at least one applicable data entry field that is required for a particular taxpayer's tax return when finalized and filed but is un-populated due to lack of information. The additional information required is obtained by engaging the user in an interview session or by receiving manual data entry inputs from the user. Further, although government tax entities may send to a taxpayer/user a tax form pre-populated with basic information (e.g., name, address, SSN, etc.) of the taxpayer, the term "partially completed" does not refer to such tax entity sent pre-populated tax form. As will be described in more detail below, the term "partially completed" refers to one or more tax forms having at least one applicable data entry field that is populated using a tax data item automatically retrieved from a bank, payroll service provider, tax entity, other financial institution, etc. on behalf of the taxpayer or automatically extracted from a user supplied electronic image of a tax document.

FIG. 1 shows a diagram of a system in accordance with one or more embodiments of the invention. As shown in FIG. 1, the system (100) includes a Tax Server (102) with an Inference Engine (104) including one or more inference rules (106) and one or more interview questions (111), a Data Import Service (105), a Tax Calculation Service (107), a Data Repository (108), and an E-file Service (109) in accordance with one or more embodiments of the invention. In one or more embodiments of the invention, the system (100) further includes a Tax Data Source A (110A) and a Tax Data Source N (110N), as well as a Client Device A (112A) and a Client Device N (112N) with a Tax Preparation Application A (114A) and a Tax Preparation Application N (114N), respectively. Each of the aforementioned components of FIG. 1 is discussed below.

The Tax Server (102) may be any device with a processor and a memory including, but not limited to, a server, a desktop computer, a laptop computer, a smart phone, etc. In one or more embodiments of the invention, the Tax Server (102) is in the form of the computer system shown in FIG. 7 and described below. In one or more embodiments of the invention, the Tax Server (102) is communicatively connected with tax data sources (i.e., Tax Data Source A (110A) and Tax Data Source N (110N)) and client devices (i.e., Client Device A (112A) and Client Device N (112N)). The Tax Server (102) may be communicatively connected using any wired or wireless connection including, but not limited to, a Local Area Network (LAN), a Wide Area Network (WAN), the Internet, telephone networks (e.g., PSTN), and/or any other suitable communication medium.

In one or more embodiments of the invention, the Tax Server (102) includes a Data Import Service (105). The Data Import Service (105) may be configured to collect the tax data from any source, including the client devices (e.g., client device A (112A), client device N (112N)), and pass along the tax data to other components of the Tax Server (102) including the Inference Engine (104). Example tax data includes but is not limited to taxpayer Personally Identifiable Information (PII), employee wage information, check/savings account routing numbers, savings interest, spouse PII, dependent PII, prior year state/local tax, real estate tax, home mortgage interest, gifts received, pension/annuity/other retirement income, business income and expense, capital gains and losses, personal property tax, social security benefit, dividends, self-employment tax, rental income, un-reimbursed employee expense, charitable donations, etc. The Data Import Service (105) may also be configured to convert the data format to a format accepted for processing by the Inference Engine (104) and storage in the Data Repository (108). In one or more embodiments of the invention, the Data Import Service (105) may be located on the client device(s) (112A, 112N) or at least have a component that interacts with an application (e.g., Tax Preparation Application A (114A) and a Tax Preparation Application N (114N)) located on the client device(s). Examples of importing tax data are described in copending U.S. patent application Ser. No. 12/797,574, filed on Jun. 9, 2010, and entitled "INFERENCE-BASED TAX PREPARATION" as well as U.S. Pat. No. 7,747,484, filed on Apr. 6, 2006, and entitled "AUTOMATED TAX RETURN WITH UNIVERSAL DATA IMPORT" both of which are also assigned to the assignee of the present application.

In one or more embodiments of the invention, the Tax Server (102) includes a Tax Calculation Service (107). The Tax Calculation Service (107) may be configured to assist the Tax Server (102) and/or applications executing on the client device (e.g., the Tax Preparation Application A (114A) and a Tax Preparation Application N (114N)) to determine the tax liability of a taxpayer and maintain the logic and tax rules/laws necessary to calculate tax liability (and/or savings) for the current tax year, calculate prior year taxes, and possibly calculate a forecast for future tax years. The Tax Calculation Service (107) may also interact with other components of the Tax Server (102) including the Inference Engine (104), which requires tax calculations and applies the tax rules to make inferences to partially complete a tax return and ask follow-up questions to complete the tax return in accordance with one or more embodiments of the invention.

In one or more embodiments of the invention, the Tax Server (102) includes a Data Repository (108). In one or more embodiments of the invention, the Data Repository (108) may be any non-transitory storage device including, but not limited to, a hard drive, memory, CD-ROMs, DVDs, flash drives, database management system, or any other suitable device/component. The Data Repository (108) may store any data sent and/or received by the Tax Sever (102), as well as store any information used and/or created by the Inference Engine (104).

In one or more embodiments of the invention, the Tax Server (102) includes a Tax E-file Service (109). The Tax E-file Service (109) is configured to allow taxpayer's prepared tax return to be filed electronically with an appropriate tax authority (e.g., Federal tax authority (e.g. Internal Revenue Service (IRS)), state tax authority (e.g. Franchise Tax Board), local and/or municipal tax authority (e.g., County Tax Appraisal Office, City Tax Office, etc.) upon the prepared tax return being validated by the user. Validation may change depending on the tax authority, but validation simply involves making sure the fields of the tax preparation application are filled with the proper contents (and the proper combination of entries) and all necessary fields are completed. In one or more embodiments of the invention, the electronic filing with the tax authority may be facilitated directly on the Tax Server (102) or on a client device (e.g., client device A (112a)) using the Tax Preparation Application A (114A)), which may be operatively connected with the Tax Server (102) depending on the requirements of the tax authority and/or the Tax Server (102).

In one or more embodiments of the invention, the Inference Engine (104) is a software application executing as instructions or logic on the Tax Server (102), and includes a component referred to as the Inference Rules (106) and stored tax related questions referred to as the Interview Questions (111). Alternatively, the Inference Engine (104) and the components referred to as the Inference Rules (106) and Interview Questions (111) may be located on and/or executing as instructions or logic on a client device (i.e., Client Device A (112A) and Client Device N (112N)). For example, the Inference Engine (104) and the Components Inference Rules (106) and Interview Questions (111) may be part of a tax preparation application (i.e., Tax Preparation Application A (114A) and Tax Preparation Application N (114N)). In one or more embodiments of the invention, the Inference Engine (104) is configured to process any tax data received by the Tax Server (102) and making any inferences, recommendations, warnings, and/or other suggestions based on the received tax data.

In one or more embodiments of the invention, the Inference Engine (104) is configured to obtain tax data about a taxpayer. More specifically, the Inference Engine (104) may automatically seek out and obtain tax data about a taxpayer. Alternatively, the taxpayer may manually enter the tax data, provide direction to the Inference Engine (104) regarding where to obtain tax data, or any combination of the above. In one or more embodiments, the tax data may be obtained from (1) tax entities where the taxpayer has filed previous returns or other government entities maintaining tax related information of the taxpayer, (2) financial institutions where the taxpayer maintains financial accounts or other service provider maintaining related financial information of the taxpayer, (3) user supplied documents such as scanned images of tax documents and/or financial documents, and (4) other sources described in reference to Tax Data Source A (110A) and Tax Data Source N (110N) below. More examples of tax data sources are described in reference to FIG. 3A below.

In one or more embodiments, the Inference Engine (104) is configured to identify required documents (e.g., a tax document, a financial document, etc.) based on basic information (e.g., employment history, active financial accounts, etc.) provided by the user. For example, a previously filed Federal tax return and a credit card statement may be determined as the required document based on the employment history information and financial account information. In such embodiments, the Inference Engine (104) may be further configured to obtain (e.g., from the user) access credentials (e.g., website URL, user name, password, etc.) to the tax entities or financial institutions maintaining such required documents. In one or more embodiments, identities of required documents may be determined during a prior tax year and stored for use without repeated identification for each tax year. In such embodiments, the corresponding access credentials may also be stored for repeated use. In one or more embodiments, a portion or all of the aforementioned basic information provided by the user, the identities of the required documents, and the corresponding access credentials may be stored in a taxpayer profile (i.e., taxpayer profile A (115A), taxpayer profile N (115N)) for repeated use. In one or more embodiments, the taxpayer profile (115A, 115N) may be maintained by the application (e.g., Tax Preparation Application A (114A), Tax Preparation Application N (114N)) executing on the client device (i.e., Client Device A (112A) and Client Device N (112N)). In one or more embodiments, the taxpayer profile (115A, 115N) may be maintained on the tax server (102), for example, stored in the data repository (108). In one or more embodiments, once the required documents are identified and access credentials obtained, the Data Import Service (105) is employed accordingly to obtain the required documents.

In one or more embodiments of the invention, the aforementioned function (or a portion thereof) to obtain tax data may be performed by a tax preparation application (i.e., Tax Preparation Application A (114A) and Tax Preparation Application N (114N)). In one or more embodiments, the tax preparation application (i.e., Tax Preparation Application A (114A) and Tax Preparation Application N (114N)) is configured to complete a partially completed tax return based on the aforementioned automatically obtained tax data. More details of generating the partially completed tax return are described in reference to FIGS. 2A and 3A-3G below.

In one or more embodiments of the invention, the Inference Engine (104) may have a set of stored tax questions referred to as Interview Questions (111), relating to the various aspects of taxes and filing taxes. The Inference Engine (104) may be configured to order the Interview Questions (111) according to relevancy (e.g., determined based at least on information contained in the partially completed tax return), and may use the generic Interview Questions (111) as a basis for creating more personalized interview questions that are presented to individual users, as explained below. For example, such personalized interview questions may be presented to the user to obtain additional tax data.

In one or more embodiments of the invention, the Inference Engine (104) may assign any tax data received a weight, such as a confidence rating representing (a) how confident the Inference Engine (104) is that tax data and/or other financial data is accurate and/or valid, or (b) a relevancy rating generated by the Inference Engine (104) representing how relevant an interview question and/or other financial question is to the preparation of the tax return. In one or more embodiments of the invention, the Inference Engine (104) is able to determine the confidence and/or relevance rating using the Inference Rules (106).

For example, any tax data directly entered by the user may receive a weight of 1 (based on a pre-defined set of inference rules), or any other suitable number, to represent that the piece of tax data is of the highest accuracy and reliability. Alternatively, tax data received from a previously filed tax return from four years ago may be assigned a weight of 0.6 (based on a pre-defined set of inference rules), indicating that the particular piece of tax data is not considered to be as reliable. As another example, an interview question related to Mortgage Interest may be assigned a weight of 1 if the Mortgage Interest Statement has already been obtained from a financial institution to answer the interview question, indicating that this question is very relevant. Alternatively, an interview question related to interest received by the taxpayer (via a 1099 form) may be assigned a weight of zero where nothing was retrieved from a financial institution or filed by the taxpayer in a previous tax return. In one or more embodiments of the invention, many different values of weights may be assigned and there may be many different ways to represent confidence/relevancy and, as such, the invention should not be limited to the above examples.

Alternatively, any suggestions, warnings, or recommendations made by the Inference Engine (104) may also receive a weight in accordance with one or more embodiments of the invention. In one or more embodiments of the invention, the weighting may be performed in many different ways and, as such, the invention should not be limited to the above examples. Further, weights may be assigned individually or in groups, and each individual data item may have more than one weight associated with it in accordance with one or more embodiments of the invention. For example, an interview question about a taxpayer's mortgage may be associated with a group of interview questions relating to assets. Thus, an interview question about a taxpayer's mortgage may receive a weight for the individual question as well as for the group of interview questions. In one or more embodiments of the invention, many different groupings and ways to assign multiple weights to a single item exist and, as such, the invention should not be limited to the above examples.

In one or more embodiments of the invention, the Inference Engine (104) may apply the Inference Rules (106) to tax data to generate inferences. The inferences may involve inferring missing tax data, personalizing interview questions, prioritizing interview questions, providing warnings, providing tax advice, populating tax returns, and/or any other relevant aspect. It will be apparent to one of ordinary skill in the art that this is not an exhaustive listing of what inferences made by the Inference Engine (104) may involve and, as such, the invention should not be limited to the above examples.

As an example of personalizing interview questions, assume that a taxpayer owned a home in the previous tax year and provided that information to the Inference Engine (104). The interview question, "Do you own a home," which would traditionally be asked may be personalized to "Did you move last year?" As another example, the question, "Who is the primary taxpayer?," which would traditionally be asked may be personalized to, "We have determined that John is the primary taxpayer, is this correct?". It will be apparent to one of ordinary skill in the art that there are many ways to personalize interview questions and, as such, the invention should not be limited to the above examples.

As an example of prioritizing interview questions, a 20 year old full-time student may be asked questions immediately about tuition (rather than income), as that is likely one of the most relevant interview questions to a 20 year old full-time student. In one or more embodiments of the invention, the interview questions with the lowest relevancy to the user may not be asked. Alternatively, all questions may be asked of the user, but in an order of most relevant to least relevant. It will be apparent to one of ordinary skill in the art that there are many ways to make inferences and, as such, the invention should not be limited to the above examples.

In one or more embodiments of the invention, the more tax data provided to the Inference Engine (104), the more accurate the inferences. In one or more embodiments of the invention, inferences may be made after each data item or document is input and/or after all data collection/entry is completed. In one or more embodiments of the invention, inferences may be disabled entirely or partially. For example, inferences may be disabled if a taxpayer indicated that an inference is incorrect. In one or more embodiments of the invention, the inferences are intended to make the process of using a tax preparation application as helpful, easy, and personalized as using a profession accountant.

The Inference Rules (106) may be a set of one or more rules used by the Inference Engine (104) to make inferences. In one or more embodiments of the invention, the Inference Rules (106) are stored as a data structure (e.g., an array, a list, a tree, a hash, a graph, etc.) in the Data Repository (108) and may be updated or changed at anytime. Alternatively, the Inference Rules (106) are coded into the structure of the Inference Engine (104) in accordance with one or more embodiments of the invention.

In one or more embodiments of the invention, the Inference Rules (106) are accessed from within the Inference Engine (104) (upon retrieval from the Data Repository (108)) while the Inference Engine (104) is executing on the Tax Server (102). The inference rules (106) may be assigned a weight, and may be updated based on feedback received on inferences made in either the current year or prior years' tax return(s). For example, if a taxpayer confirms that an inference is correct, the weight of that inference may be updated. Conversely, if a taxpayer indicates that an inference is incorrect, then the inference rule may be changed to make it more accurate and/or update the weight. In one or more embodiments of the invention, the inference rules (106) benefit from being able to collect feedback from a large group of taxpayers as part of a community, consortium, etc. thereby making the rules more accurate.

The Tax Data Source A (110A) and the Tax Data Source N (110N) may include any potential data source of financial (including tax) data. Examples of potential data sources of financial data may include, but are not limited to, government agencies, financial institutions, the IRS, state and local tax authorities, employers, payroll companies, stockbrokers, previous tax returns, credit card statements, financial websites, physical documents (including original documents and/or scanned images thereof), and any other supplier of financial (including tax) data. It will be apparent to one of ordinary skill in the art that this is not an exhaustive listing of suppliers of tax or financial data and, as such, the invention should not be limited to the above examples.

The Tax Data Source A (110A) and the Tax Data Source N (110N) may be communicatively connected or otherwise accessible to the Tax Server (102) via any wired or wireless connection. The Tax Data Source A (110A) and the Tax Data Source N (110N) may also be communicatively connected or otherwise accessible to the Client Device A (112A) and the Client Device N (112N). In one or more embodiments of the invention, the Client Device A (112A) and the Client Device N (112N) may act as a tax data source, for example, by allowing the user to manually provide tax data. For example, the Client Device A (112A) and the Client Device N (112N) may include optical scanning and/or other image capture device (e.g., a scanner, camera, etc.) to provide an image of a user supplied document as tax data to the tax server (102). In another example, the user may manually enter tax data using the Client Device A (112A) and the Client Device N (112N).

The Client Device A (112A) and the Client Device N (112N) may be any device with a processor and a memory including, but not limited to, a server, desktop computer, laptop computer, cell phone, smart phone, Personal Digital Assistant, media player, handheld gaming device, and/or any other suitable device. In one or more embodiments of the invention, the Client Device A (112A) and the Client Device N (112N) may include a display, touch screen display, input devices such as a mouse or keyboard, image capturing device such as a camera or scanner, storage devices, and/or any other suitable element. Further, in one or more embodiments of the invention, the Client Device A (112A) and the Client Device N (112N) are in the form of the computer system shown in FIG. 7 and described below. In one or more embodiments of the invention, the Client Device A (112A) and the Client Device N (112N) may be capable of executing the Tax Preparation Application A (114A) and the Tax Preparation Application N (114N), respectively.

The Tax Preparation Application A (114A) and the Tax Preparation Application N (114N) may present a Graphical User Interface (GUI) to the user to aid in preparing a tax return. In one or more embodiments of the invention, the Tax Preparation Application A (114A) and the Tax Preparation Application N (114N) may obtain tax data from the Tax Data Source A (110A), the Tax Data Source N (110N), and the user, or any combination thereof. In one or more embodiments of the invention, the Tax Preparation Application A (114A) and the Tax Preparation Application N (114N) may populate tax forms with data provided by the Inference Engine (104). In one or more embodiments of the invention, the Tax Preparation Application A (114A) and the Tax Preparation Application N (114N) may facilitate the filing of tax forms with data provided by the Inference Engine (104). Further, the Tax Preparation Application A (114A) and the Tax Preparation Application N (114N) may display interview questions and tax advice to the user, as well as receive responses.

The Tax Preparation Application A (114A) and the Tax Preparation Application N (114N) may include an inference engine (i.e., Inference Engine (104)), inference rules (i.e., Inference Rules (106)) or any of the above described functionality of the Inference Engine (104). In one or more embodiments of the invention, the Tax Preparation Application A (114A) and the Tax Preparation Application N (114N) may be located and execute on the Tax Server (102), rather than on a client device as depicted in FIG. 1.

As noted above, embodiments of the invention generate the partially completed tax return based on basic user information provide by a user or stored in a user profile without needing to obtain other user inputs through an extensive user interview early in the completion process. A list of simple and concise follow-up interview questions are then generated or selected from an interview question collection based on the partially completed tax return to finalize the prepared tax return.

An example method for obtaining basic user information and generating a user profile to be used repeatedly for future tax years is described in U.S. Pat. No. 7,747,484, filed on Apr. 6, 2006, and entitled "AUTOMATED TAX RETURN WITH UNIVERSAL DATA IMPORT," which is also assigned to the assignee of the present application and incorporated herein by reference. In particular, a taxpayer maintains a plurality of relationships with a plurality of financial institutions. A financial institution is any entity that provides tax information about taxpayers, and a taxpayer has a relationship with a financial institution if the financial institution provides tax data about that taxpayer. The present invention includes a preliminary interview process that solicits data from the taxpayer by inquiring about the taxpayer's relationships with financial institutions, and not merely asking forms-based questions that simply track the layout of IRS tax forms.

There are many ways in which taxpayers can receive tax data. For example, in one embodiment, the taxpayer provides a list of financial institutions (e.g., banks, credit card company, payroll service providers, etc.) with which he/she has a relationship, and the tax software (e.g., various software components described in reference to FIG. 1 above) retrieves information directly from the financial institution. In one embodiment, the taxpayer selects the financial institutions from a list provided by the software. In alternative embodiments, the taxpayer provides unique identifying information about the financial institution, such as an employer identification number (EIN) in the case of a payroll provider, or such other equivalent identifiers as may be appropriate for different types of financial institutions. The software determines whether the financial institution associated with the identifying information is able to provide tax data related to the taxpayer. If so, then the software retrieves that data and uses it to prepare a tax return.

Figure 2A:
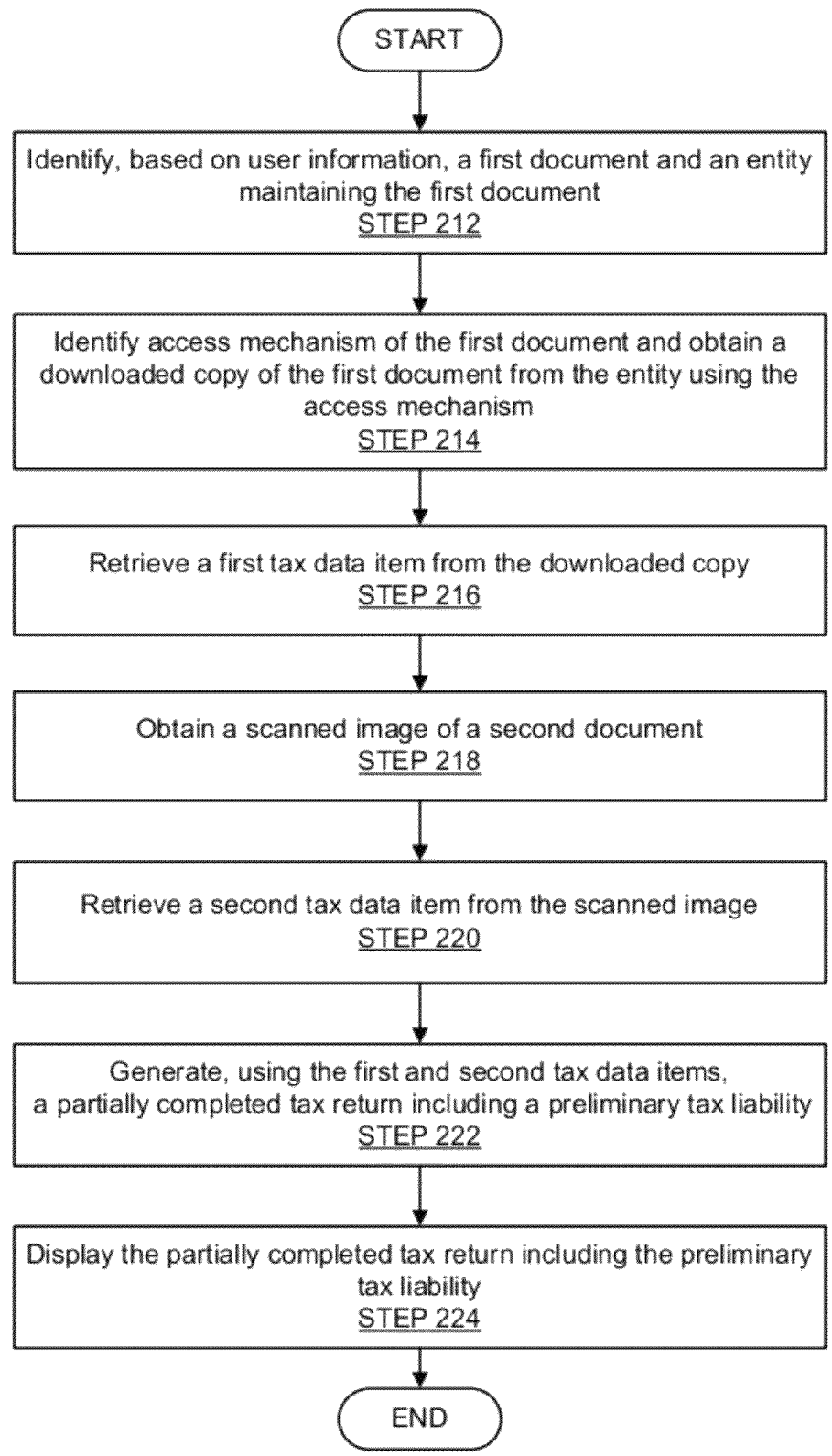
FIG. 2A shows a flowchart of a method for generating a partially completed tax return in accordance with one or more embodiments of the invention.
Figure 2B:
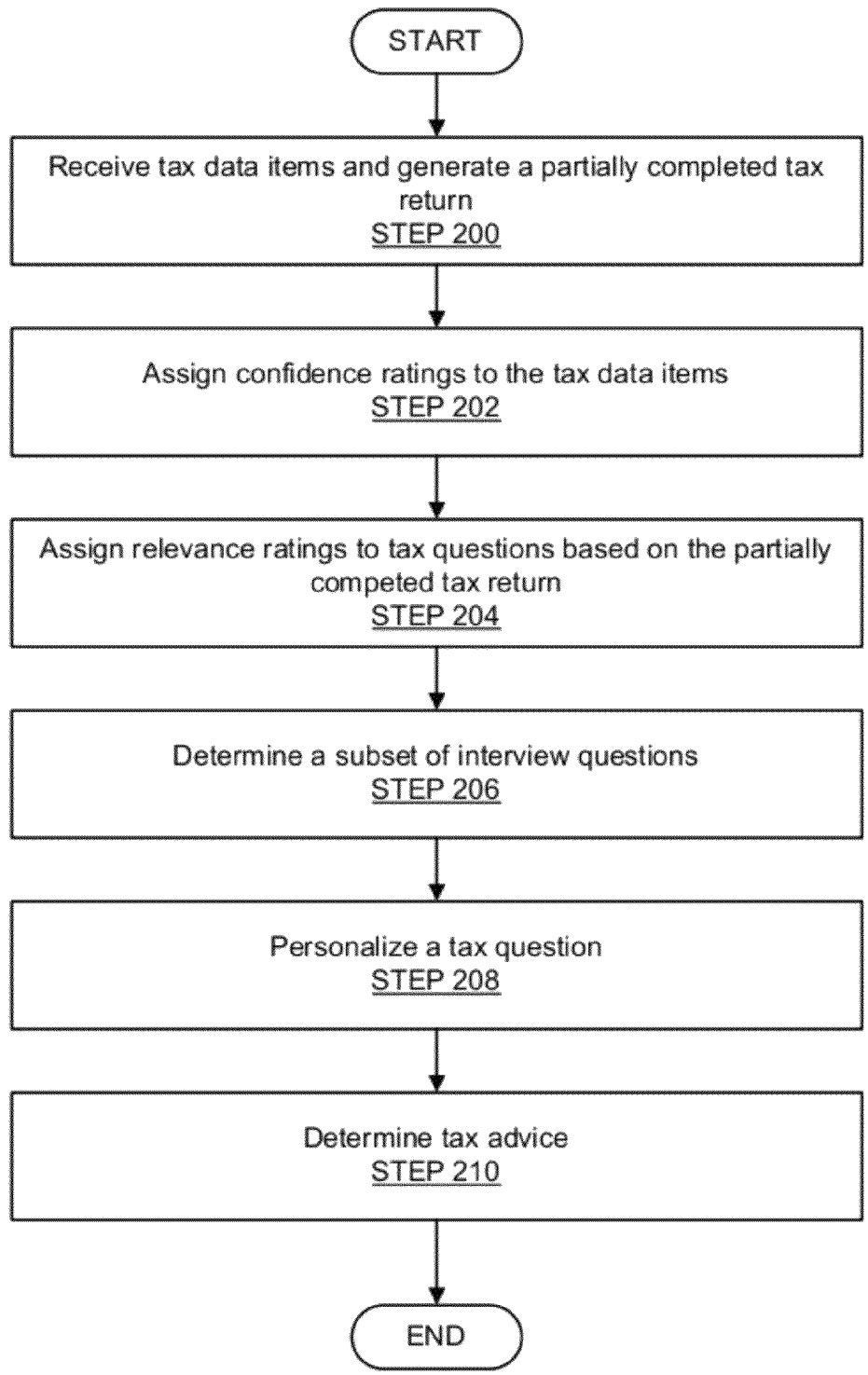
FIG. 2B shows a flowchart of a method for operating an inference engine in accordance with one or more embodiments of the invention.
Figure 2C:
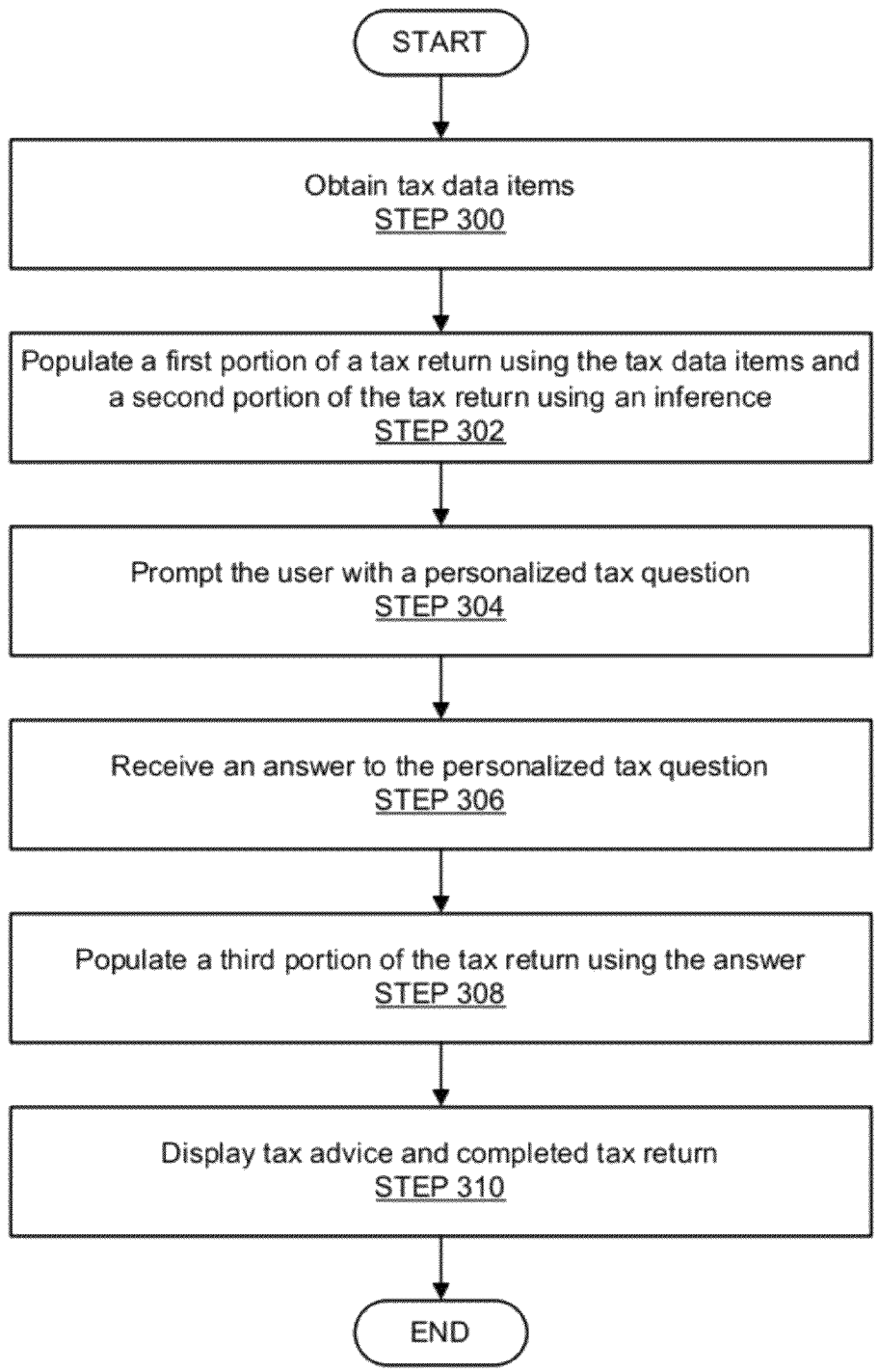
FIG. 2C shows a flowchart of a method for completing a tax return in accordance with one or more embodiments of the invention.

In the description below, FIG. 2A shows a method flowchart for generating the partially completed tax return from basic user information or user profile. FIG. 2B shows a method flowchart for generating the interview questions. FIG. 2C shows a method flowchart for completing the prepared tax return.

In one or more embodiments, the method of FIG. 2A is implemented using a tax server (e.g., the tax server (102) described in reference to FIG. 1 above) where an operator or service provider of the tax server enters into agreements with various financial institutions. Throughout this document, information download based on explicit agreements with the financial institutions is referred to as electronic download. For example, such agreements designate an employer (identified based on the user provided EIN—Employer Identification Number) as a partner of the tax server operator/service provider and authorize, upon employee authentication, the tax server to download employee's (i.e., taxpayer's) W-2 document from a computer of the employer or the employer's payroll service provider.

The electronic download may use various download protocols including the Open Financial Exchange (OFX) protocol. For example, the employee authentication may require the employee (i.e., taxpayer) to access an employee account at the financial institution and explicitly authorize such electronic download. Employee authorization may vary depending on partner and require, for example, SSN and the values of certain boxes on the W-2 document for some partners and require SSN, user ID and password for other partners. Once authorized, the tax server is allowed to download financial information of the taxpayer without separately providing taxpayer access credentials. Similarly, an agreement may designate a bank as a partner of the operator/service provider and authorize, upon taxpayer authentication, the tax server to download taxpayer's 1098 (mortgage interest) document and 1099 (dividend and interest) document from a computer of the bank. Taxpayer authorization may vary depending on partner and require, for example, user ID and password of the taxpayer account. Once authorized, the tax server is allowed to download financial information of the taxpayer without separately providing taxpayer access credentials.

Alternatively, information download without explicit agreement between the tax server operator/service provider and the financial institutions is referred to as web scraping. Rather than the taxpayer providing explicit authorization to the financial institution (e.g., via website thereof) and authorizes the tax server to pull data on behalf of the taxpayer, the taxpayer authorizes the tax server to access taxpayer accounts in the financial institutions using access credentials (e.g., user ID and password) of respective taxpayer accounts. Accordingly, the tax server uses such access credentials to access the taxpayer account at the financial institution's website. Once in the account, a technique referred to as web crawling is used to identify where the tax document(s) exist and then scrape the tax data rendered on the website. The data scraped is then pushed into the tax return of the taxpayer.

Tax records may be retrieved by the tax server from IRS using the IRS e-service. In particular, a taxpayer authorizes the tax server to retrieve data on behalf of the taxpayer through the IRS e-service. Capabilities of the IRS e-service include but are not limited to Transcript (Return and/or Tax schedule) Delivery System (TDS) for providing transcripts of filed return and/or other tax schedules as well as Electronic Account Resolution (EAR) for processing inquiries regarding the taxpayer's account. As an example, the tax server may sign-in to the IRS website and electronically retrieve the taxpayer's prior year return transcripts. The data may be electronically retrieved using either an electronic download mode or a web scraping mode. Data (e.g. name, date of birth, address, age, forms used and/or completed, etc.) extracted from the prior year return is then used to pre-populate the current year return. Alternatively, the user may send (e.g. upload, email, etc.) an image (e.g., created by a scanner or camera) of the taxpayer's prior year return to the tax server that in turn extract the data to pre-populate the current year return.

FIG. 2A shows a flowchart of a method for generating a partially completed tax return in accordance with one or more embodiments of the invention. In one or more embodiments of the invention, one or more of the steps shown in FIG. 2A may be omitted, repeated, and/or performed in a different order. Accordingly, embodiments of the invention should not be limited to the specific arrangements of steps shown in FIG. 2. The method depicted in FIG. 2A may be practiced using a system such as that described with respect to FIG. 1 above.

In Steps 212 through 220, tax data items are collected without user intervention. Initially in Step 212, a first document is identified based on user information. For example, the first document may include W-2 document, 1098 and/or 1099 document, prior year tax return, credit card statement, checking account statement, savings account statement, etc. In addition to identifying the first document, an entity (e.g., bank, mortgage lender, payroll service provider, IRS, etc.) maintaining the document is also identified in Step 212. In one or more embodiments, user information may be obtained from a user profile including SSN, name, address, employment status, home ownership, financial accounts information, etc. Typically, the user profile has been created in preparing a previous tax return during first time use of the method when the user was prompted to provide such information to creating the user profile. In one or more embodiments, the first document is identified using an inference rule. For example, if employment status indicated the taxpayer as an employee, then it is inferred that W-2 document is required. In another example, if home ownership indicates the taxpayer as a home owner, then it is inferred that the 1098 document may be required.

In Step 214, an access mechanism for accessing the first document from the entity is identified and used to obtain a downloaded copy of the first document. In one or more embodiments of the invention, the access mechanism may include electronic download, web scraping, IRS e-service as described above, or any combination thereof. For example, whether the first document may be accessed using electronic download may be determined by searching the employer EIN in the user profile throughout existing partner agreements described above. Accordingly, electronic download is used if authorized under an agreement; otherwise, web scraping is used if access credentials are included in the user profile.

In Step 216, a first tax data item is retrieved from the first document by applying the plurality of inference rules based on the downloaded copy. In one or more embodiments of the invention, a document template is identified based on the identity of the first document determined in Step 212 above. Based on the identified template, data fields of the first document may be searched (e.g., using optical character recognition) and each data field determined as to whether it is applicable to the tax return. In one or more embodiments, such determination is based on inference rules of an inference engine (e.g., the Inference Engine (104) described in reference to FIG. 1 above). Accordingly, the first tax data item is then retrieved from the first document.

In Step 218, a scanned image of a second document is obtained, for example as supplied by the user. For example, the second document may include a hard copy W-2 document, 1098 and/or 1099 document, prior year tax return, credit card statement, checking account statement, savings account statement, etc. In one or more embodiments of the invention, a user selection menu is displayed including a list of document types or a collection of images of example documents to prompt a user to select an item from the user selection menu. Accordingly, an identity of the second document is determined based on the user selection and a document template of the second document is identified based on the identity of the second document. Based on the identified template, data fields of the second document may be searched (e.g., using optical character recognition) and each data field determined as to whether it is applicable to the tax return. In one or more embodiments, such determination is based on inference rules of an inference engine (e.g., the Inference Engine (104) described in reference to FIG. 1 above). Accordingly, a second tax data item is then retrieved from the first document (Step 220).

In Step 222, a partially completed tax return is generated by populating a tax form of the tax return using the first and second tax data items and calculating a preliminary tax liability from at least the first and second tax data items. More details of populating the tax form are described in reference to FIGS. 2B and 2C below. Once all required tax forms of the tax return are pre-populated using all of the automatically obtained tax data items including but not limited to the first and second tax data items, the preliminary tax liability is calculated, for example using the tax table or other tax calculation rules provided by a government tax entity.

In Step 224, the partially completed tax return including the preliminary tax liability is displayed to the user. In one or more embodiments of the invention, the partially completed tax return is displayed along with a set of follow-up interview questions to prompt user for additional tax information (e.g., additional tax data items or clarification of tax data items associated with low confidence level) and validation for accuracy of the partially completed tax return. More details of receiving additional user input for expanding the partially completed tax return into a finalized prepared tax return are described in reference to FIGS. 2B, 2C, 3G, and 4-6 below.

FIG. 2B shows a flowchart of a method for operating a tax inference engine in accordance with one or more embodiments of the invention. The method of FIG. 2B may be implemented, for example, using the system of FIG. 1. In one or more embodiments of the invention, one or more of the steps shown in FIG. 2B may be omitted, repeated, and/or performed in a different order than the order shown in FIG. 2B. Accordingly, the scope of the invention should not be considered limited to the specific arrangement of Steps shown in FIG. 2B.

Initially, in Step 200, tax data items are received to prepare a partially completed tax return in accordance with one or more embodiments of the invention. In one or more embodiments of the invention, the tax data items may be received from a tax data source. Examples of tax data sources include a government agency, financial institution, employer, payroll company, stockbroker, previous tax return, receipts, credit card statements, bills, invoices, charitable contribution donation records, documents obtained through OCR techniques of document images, documents obtain through screen scraping of websites, and/or any other supplier or source of tax data. The tax data items may be received in any order (including an order set by the user), and at any time. An example of tax data items that may be processed by an interference engine is credit card statement that includes one or more medical expenses. The inference engine would be interested in this data because itemized deductions may be possible and one or more tax forms will need to be populated if summing the medical purchases found on one or more credit card statements reaches a certain amount. In one or more embodiments, a partially prepared return may be generated from automatically collected tax data, as described in reference to FIGS. 2A and 3A-3G.

Figure 4:
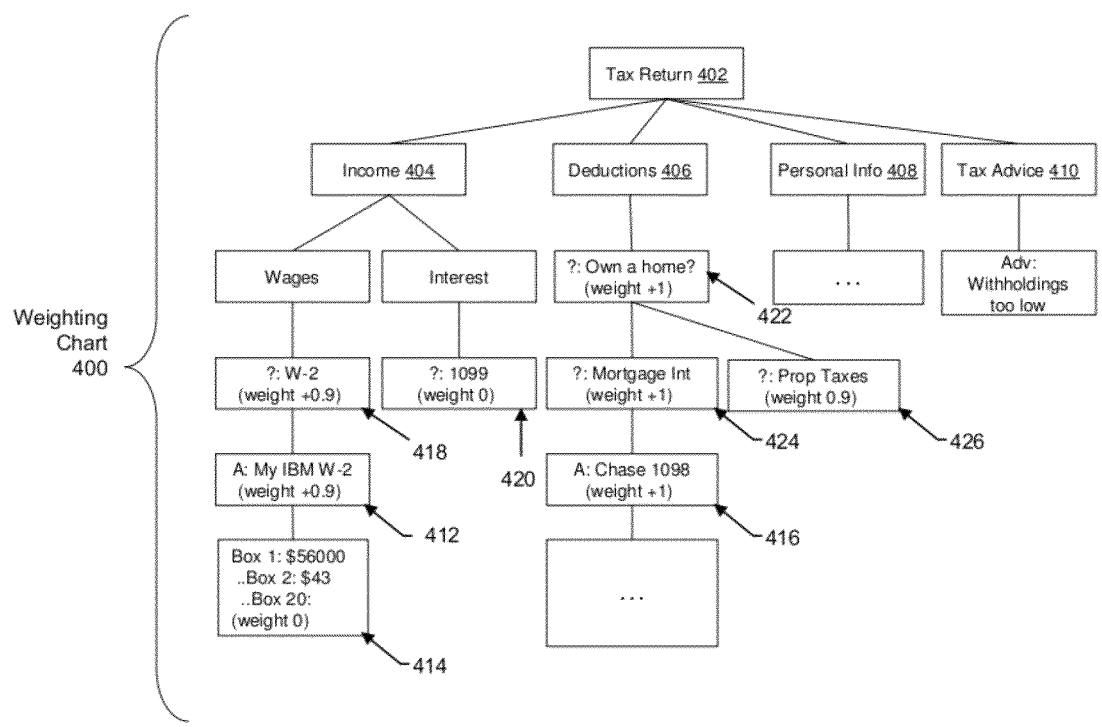
FIG. 4 shows a weighting chart in accordance with one or more embodiments of the invention.

In Step 202, confidence ratings are assigned to the tax data items in accordance with one or more embodiments of the invention. In one or more embodiments of the invention, confidence ratings may be a weight that reflects the confidence in the correctness or validity of the tax data item(s) as shown in FIG. 4 and described below. In one or more embodiments of the invention, the confidence is determined by logic found within the inference engine as well as inference rules. These inference rules may be established based on information compiled from tax experts that capture rules for preparation and advice and the process of capturing the rules is in the form of a feedback loop so the rules consistently improve over time.

For example, tax data items from a tax form, such as a W-2 form of the current tax year, will receive a high confidence rating, while data from an older tax form, such as a W-2 from a prior year, would receive a lower confidence rating. In one or more embodiments of the invention, the inference engine may use inference rules to assign the confidence ratings. A confidence rating of 1 may be used to indicate that the tax data item is most likely correct, while a lesser rating, such as 0.6, may be used to indicate that the tax data item may be less likely to be correct. It will be apparent to one of ordinary skill in the art that a variety of ways exist to assign confidence ratings and, as such, the invention should not be limited to the above examples.

In Step 204, relevancy ratings are assigned to interview questions in accordance with one or more embodiments of the invention. In one or more embodiments of the invention, interview questions may be a set of stored interview questions covering all aspects of taxes including at least tax preparation and tax advice. In one or more embodiments of the invention, relevancy ratings may be a weight that is determined base on a partially completed tax return (e.g., generated using the method described in reference to FIG. 2A above) that reflects how relevant the interview question is to the particular situation of the user as shown in FIG. 4 and described below. In one or more embodiments of the invention, the relevancy ratings are determined by logic found within the inference engine as well as inference rules. These inference rules may be established based on information compiled from tax experts that capture rules for preparation and advice and the process of capturing the rules is in the form of a feedback loop so the rules consistently improve over time.

For example, questions relating to school expenses are extremely relevant to a student, thus receiving a high relevancy rating when the user is a student, but if the user is a retiree that same interview question may receive a low relevancy rating. Likewise, questions relating to home ownership are likely irrelevant to a user who rents an apartment, and thus may receive a low relevancy rating. In one or more embodiments of the invention, the inference engine may use inference rules to assign the relevancy ratings. A relevancy rating of 1 may be used to indicate that the interview question is more relevant, while a lesser rating, such as 0.5, may be used to indicate that the interview question may be less relevant. It will be apparent to one of ordinary skill in the art that there are a variety of ways to assign relevancy ratings and, as such, the invention should not be limited to the above examples.

In Step 206, a subset of interview questions is determined in accordance with one or more embodiments of the invention. In one or more embodiments of the invention, the subset of interview questions may be determined from a set of stored interview questions. The subset may be determined using the relevancy ratings assigned in Step 204. Further, the subset may be determined after presenting the subset to the user for validations, corrections, and/or additional input. In one or more embodiments of the invention, the subset may be all interview questions exceeding (above or below, depending on perspective) a particular threshold relevancy rating. Alternatively, the subset may initially include all of the stored interview questions. In one or more embodiments of the invention, the subset of interview questions may be updated each time a new tax data item or answer to an interview question is received. It will be apparent to one of ordinary skill in the art that there are a variety of ways to determine a subset of interview questions and, as such, the invention should not be limited to any of the above examples.

In Step 208, an interview question is personalized in accordance with one or more embodiments of the invention. In one or more embodiments of the invention, personalizing an interview question may involve altering the wording of an interview question, such as inserting tax data associated with the user. Personalizing an interview question may be done using inference rules, as well as tax data and confidence ratings. The inference rules may be established based on information compiled from tax experts that capture rules for preparation and advice and the process of capturing the rules is in the form of a feedback loop so the rules consistently improve over time.

In one or more embodiments of the invention, the entire subset of interview questions may be personalized at the same time. Alternatively, one interview question may be personalized at a time, so that the most recently received tax data may be included. It will be obvious to one of ordinary skill in the art that there are many ways to personalize interview questions and, as such, the invention should not be limited to the above examples. In general, it will be apparent to one of ordinary skill in the art that the purpose of personalizing interview questions is to provide more accurate and relevant questions, reduce the amount of effort required by a user to file taxes, and to make the user feel that the tax preparation application knows the situation of the user and, as such, the invention should not be limited to the above examples.

In Step 210, tax advice is determined in accordance with one or more embodiments of the invention. In one or more embodiments of the invention tax advice may include a warning about the user being audited. Alternatively, tax advice may be a way to save money on your taxes. For example, tax advice may be to increase contribution to a 401K or other retirement account to reduce a tax burden (if the maximum pre-tax retirement contribution for the taxpayer or the taxpayer's spouse based on the current tax law has not been reached) or increase the number of exemptions claimed on the W-4 to avoid overpaying taxes. Another example of tax advice is suggesting a tax saving by using an available, unused tax credit (such as for buying a home, receiving a post-secondary education, etc.). In one or more embodiments of the invention, tax advice may be determined using inference rules, as well as tax data and confidence ratings. These inference rules may be established based on information compiled from tax experts that capture rules for preparation and advice and the process of capturing the rules is in the form of a feedback loop so the rules consistently improve over time. It will be apparent to one of ordinary skill in the art that there are many ways to determine tax advice and, as such, the invention should not be limited to the above examples.

FIG. 2C shows a flowchart of a method for completing a tax return in accordance with one or more embodiments of the invention. The method of FIG. 2C may be implemented, for example, using the system of FIG. 1. In one or more embodiments of the invention, one or more of the steps shown in FIG. 2C may be omitted, repeated, and/or performed in a different order than the order shown in FIG. 2C. Accordingly, the scope of the invention should not be considered limited to the specific arrangement of steps shown in FIG. 2C.

Initially, in Step 300, tax data items are obtained in accordance with one or more embodiments of the invention. In one or more embodiments of the invention, the tax data items may be obtained from a tax data source. Examples of tax data sources may include a government agency, financial institution, employer, payroll company, stockbroker, previous tax return, receipts, credit card statements, bills, invoices, charitable contribution donation records, documents obtained through OCR techniques of document images, documents obtain through screen scraping of websites, and/or any other supplier or source of tax data. As mentioned above, an example of tax data items that may be processed by an interference engine is a credit card statement that includes one or more medical expenses. The inference engine would be interested in this data because itemized deductions may be possible and one or more tax forms will need to be populated if summing the medical purchases found on one or more credit card statements reaches a certain amount. The tax data items may be obtained in any order (including an order set by the user) and at any time. In other words, a user is not forced to supply any specific document at given time. In one or more embodiments, a partially prepared return may be generated from automatically collected tax data, as described in reference to FIGS. 2A and 3A-3G.

In Step 302, a first and second portion of a tax return is populated in accordance with one or more embodiments of the invention. In one or more embodiments of the invention, the first portion may be populated using data obtained in Step 300, while the second portion may be populated using an inference. In one or more embodiments, the tax return is the partially completed tax return generated using the method described in reference to FIG. 2A above. As described above, inferences may include, but are not limited to: inferring missing tax data, personalizing interview questions, prioritizing interview questions, providing warnings, providing tax advice, and any other relevant aspect. The population of the second portion of the tax return may be done using inference rules, as well as tax data and confidence ratings. The inference rules may be established based on information compiled from tax experts that capture rules for preparation and advice and the process of capturing the rules is in the form of a feedback loop so the rules consistently improve over time. In one or more embodiments of the invention, the portions of the tax return may be populated in any order (including an order set by the user) and at any time.

In Step 304, the user is prompted with a personalized interview question in accordance with one or more embodiments of the invention. In one or more embodiments of the invention, a personalized interview question may be any interview question specifically tailored to the user. Because of the tailored nature of the questions, the user may feel that the tax preparation application "knows" the particular situation of the user. For example, the personalized interview question may change the standard, "Do you have any dependents?" question to, "Would you like to claim John and Sue as dependents?" Further, a personalized interview question may include interview questions that are prioritized according to the particular situation of the user. For example, rather than asking every user the same questions in the same order, if a user indicates that he or she rents an apartment and has dependents, then interview questions relating to dependents and/or renting may be prioritized higher than questions relating to owning a home. Other personalized interview questions or statements may include: "We found $3202 in medical expenses. Click to verify . . . ", "You weren't asked about child care expenses because you don't have children.", "You own a home, click here to download your property taxes.", and "You made donations last year. Click here if you had non-cash donations." It will be apparent to one of ordinary skill in the art that there are many ways to personalize interview questions and, as such, the invention should not be limited to the above examples.

In Step 306, an answer to the personalized interview question is received in accordance with one or more embodiments of the invention. In one or more embodiments of the invention, the answer may be received in any method known in the art. After receiving the answer, a third portion of the tax return is populated using the answer in accordance with one or more embodiments of the invention (Step 308). Finally, in Step 310, tax advice and a prepared tax return are displayed to the user in accordance with one or more embodiments of the invention. In one or more embodiments of the invention the tax advice and prepared tax return may be displayed through a GUI, displayed on a monitor or other display, or displayed through any other suitable method. Alternatively, the tax advice and prepared tax return may be printed, faxed, or displayed to the user in any other suitable way. Alternatively, the tax advice may include a warning, such as telling the user that there is a high risk of being audited. Tax advice may also suggest a tax saving by using an available, unused tax credit (such as for buying a home, receiving a post-secondary education, etc.) or by maximizing the amount of pre-tax money place in a retirement account.

In one or more embodiments of the invention, examples of tax advice may include "By contributing up to $5000 to your retirement account (such as an IRA or 401K), you could save $1400 in taxes. Click for more . . . ", "By claiming 4 allowances on your W-4, you can avoid penalties next year. Click for more . . . ", "Using a Flexible Spending Account for your dependent care . . . you could save $480 dollars.", "Buying a home before Apr. 30, 2010 would save you $3,500 from the new home buyer's credit.", "One of your dependents will be 17 next year, . . . illustrate amount by which taxes will increase next year.", "Phase Out Savings: You didn't benefit from your rental losses this year, if you contribute more to your 401k you can get below the limit to use your rental losses.", "You can receive your Earned Income Credit ratably all year saving money on late fees and credit card interest . . . ", "You have a new child . . . know about the 529 savings plan? Want to learn more?", "Renting your home? Click here to see an estimate of tax savings for buying a home." It will be apparent to one of ordinary skill in the art that there are many kinds of advice, and as such, the invention should not be limited to the above examples.

In the scenario where the answer includes an additional tax data item, as described above, the prepared tax return is generated based on the answer by further populating the tax form using the additional tax data item and further calculating the preliminary tax liability to generate the finalized tax liability.

In another scenario, the answer includes a confirmation to a clarifying question regarding a tax data item associated with low confidence level. In such a scenario, the partially completed tax return is adjusted based on the confirmation to generate the prepared tax return.

Once all interview questions are answered and the received answers are processed to generate a prepared tax return, the user is prompted to validate the prepared tax return. Upon receiving such validation from the user, the prepared tax return is filed electronically.

FIGS. 3A through 3G show examples of generating a partially completed tax return in accordance with one or more embodiments of the invention.

Figure 3A:
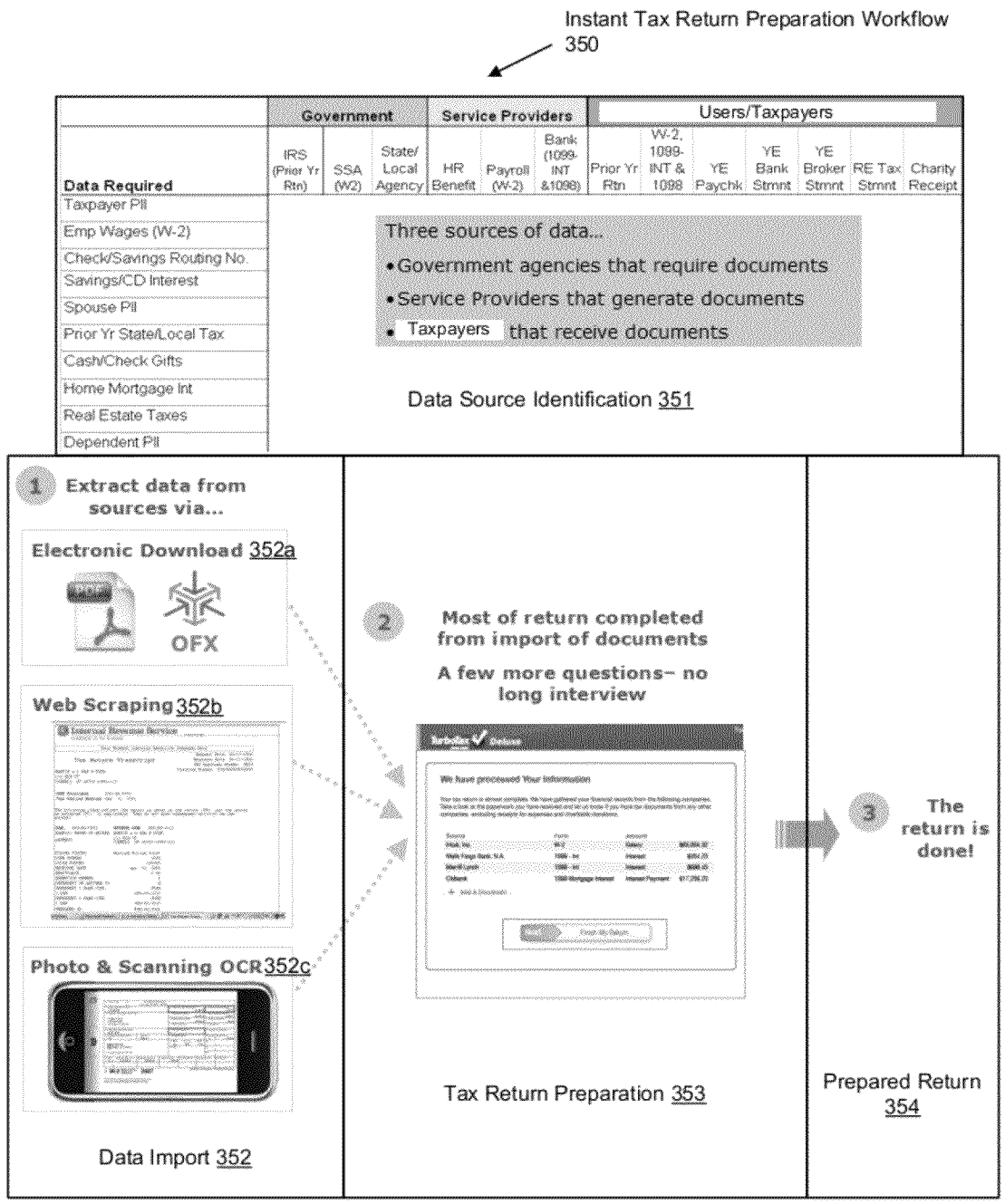

FIG. 3A shows an example instant tax return preparation workflow (350) in schematic format, including data source identification (351), data import (352), and tax return preparation (353), resulting in the prepared return (354). As shown in FIG. 3A, data source identification (351) depicts three categories of tax data sources: namely government entities, service providers, and users/taxpayers. In particular, prior year tax returns are available from IRS and state/local tax agencies, W-2 forms are available from social security administration (SSA) and/or human resource (HR)/payroll service providers, while 1099 forms and/or 1098 forms are available from banks and other financial institutions (e.g., mortgage lender, etc.). For example, various tax data such as taxpayer PII, employee wages, check/savings routing number, savings/CD interest, spouse PII, prior year state/local tax, gifts, home mortgage interest, real estate taxes, dependent PII, etc. may be extracted from the three categories of tax data source depicted in FIG. 3A. As described in reference to FIG. 2A above, an inference engine may be used to determined, based on a taxpayer profile, data sources and required documents for preparing tax return of the user.

Further as shown in FIG. 3A, data import (352) depicts three alternative mechanisms for importing tax data from the sources identified in data source identification (351). For example, tax data contained in W-2 forms may be downloaded from a payroll service provider as illustrated by electronic download (352a), or scanned and OCRed from a hard copy W-2 form as illustrated by photo & scanning OCR (352c), while a prior year tax return may be downloaded from IRS e-service as illustrated by web scraping (352b). In particular, in the photo & scanning OCR (352c) step, a hard copy W-2 form and other user submitted hard copy documents are randomly provided by the user without any particular requirement of what forms need to be provided or what order to provide the forms in. Further, either a phone camera or an optical scanner may be used to capture an image of the hard copy W-2 form for optical recognition in step 352c. In one or more embodiments of the invention, a number of payroll service providers are queried for availability of a particular taxpayer's W-2 form for electronic download. In one or more embodiments, if available, the electronic download (352a) step is used as the preferred mechanism to import tax data while the photo & scanning OCR (352c) step is only used if the W-2 is not available from any of the queried payroll service providers. Generally, tax data obtained from the electronic download (352a) may either be obtained in directly usable electronic format from a source supporting the open financial exchange (OFX) protocol or extracted from an electronic document (e.g., in PDF format) embedding the tax data from a source where OFX is not supported. Further, the electronic download (352a) and web scraping (352b) may be used based on prior user authorization and access credentials provided by the user.

Further as shown in FIG. 3A, tax return preparation (353) depicts populating the tax return using tax data collected automatically in data import (352) step without user intervention. According, a preliminary tax liability is calculated based on such automatically collected tax data to generate a partially completed tax return. For example, 50-75% (measured against the final version of the prepared return) of all required fields may be populated in the partially prepared return. Further, the partially completed tax return is presented (e.g., displayed) to the user for verification/validation along with a short list of additional questions (e.g., less than 10 questions). For example, an interview question may be presented to collect additional tax data not available from the data import (352) step. In another example, another interview may be presented to the user for confirming certain assumptions adopted in the tax return preparation (353) step. Example questions are described in reference to FIGS. 5 and 6 below. Once the answers are received from the user, the partially completed tax return may then be completed by further populating any missing information and/or making adjustments based on the user answers to generate the prepared return (354). More details of the example instant tax return preparation workflow (350) are described separately in FIGS. 3B through 3G below.

FIG. 3B shows a basic information screenshot (355) and an identity confirmation screenshot (358) used for prompting a user to enter some basic information, such as name and social security number, depicted in the data entry fields A (356). In addition, the basic information screenshot (355) includes an action button A (357) for advancing to the next step based on user activation. As shown, the next step is to verify user identity, which is illustrated in the identity confirmation screenshot (358) where personal information retrieved from a taxpayer profile is displayed in the data entry fields B (359) for user validation. For example, a date of birth, a zip code, and a telephone number are retrieved from a taxpayer profile based on the user name and social security number entered via the data entry fields A (356) above. Once the user clicks the action button B (360), tax information of the taxpayer is obtained using the method described in reference to FIG. 2A above and the workflow advances to the next step illustrated in FIG. 3C.

Figure 3C:
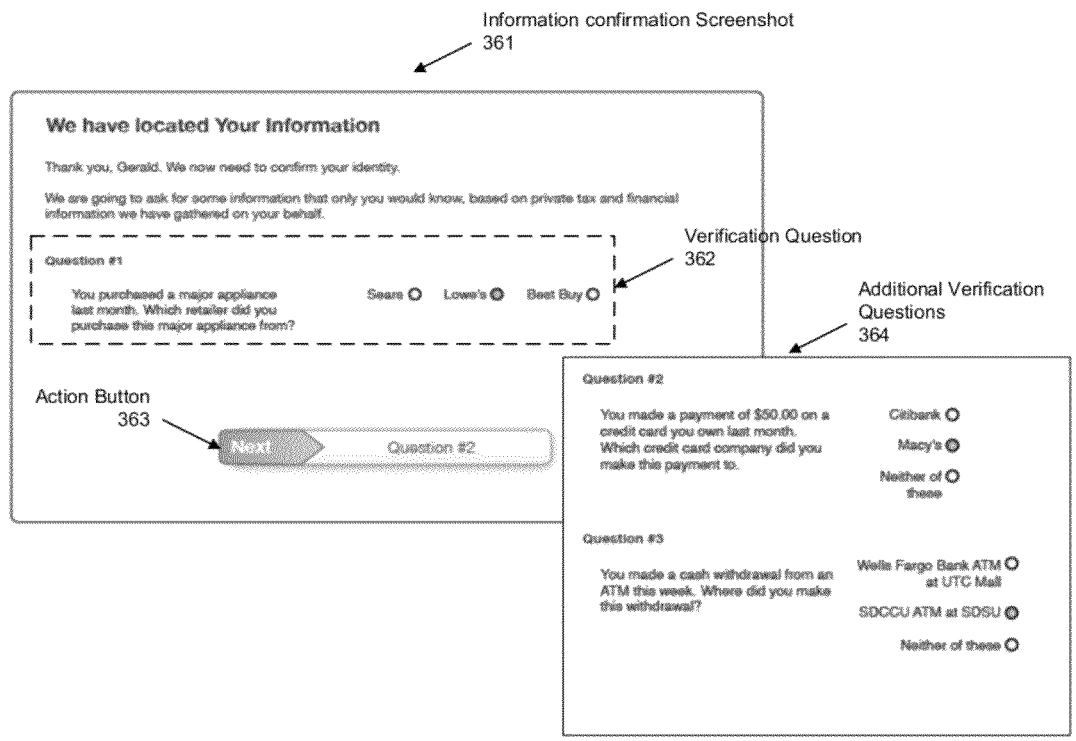

FIG. 3C shows an information confirmation screenshot (361) indicating to the user that tax information (e.g., bank statement and credit card statement) are located and requesting user confirmation. For example, taxpayer's bank statement and credit card statement for the tax year are obtained electronically on taxpayer's behalf based on online account access user name and password retrieved from the taxpayer profile. Accordingly, information regarding recent purchases is extracted from the bank statement and presented as verification question (362) to the user. The user may choose to answer the verification question (362) or use the action button (363) to answer additional verification questions (364) instead. Here, the additional verification questions (364) are similar questions relating to recent payment and cash withdrawal that are identified from the obtained bank statement and credit card statement. Once the user confirms the obtained information as pertaining to the taxpayer by answering the verification question (362) or the additional verification questions (364) correctly, the workflow advances to obtaining additional tax information from one or more hardcopy paper document supplied by the user, as illustrated in FIGS. 3D through 3F.

Figure 3D:
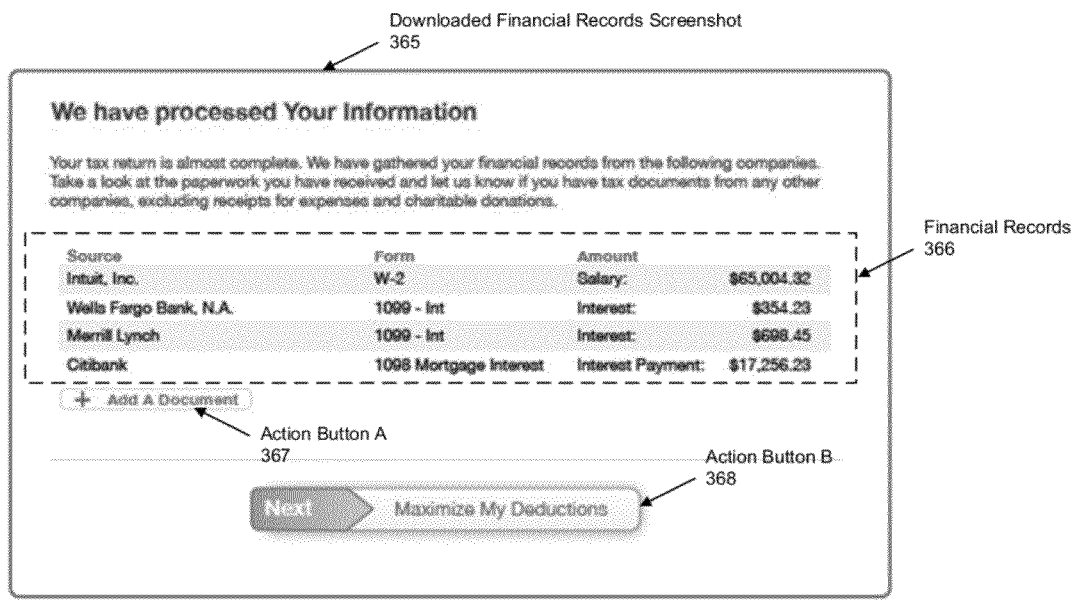

FIG. 3D shows a downloaded financial record screenshot (365) depicting a summary of documents and financial records contained therein in the financial records (366) panel. A user may choose to add an additional document, illustrated in FIG. 3E, by clicking the action button A (367) before proceeding to optimize the tax return. If the user decides that all documents are included after reviewing the financial records (366), the user may click the action button B (368) to optimize the tax return, for example by maximizing deductions.

Figure 3E:
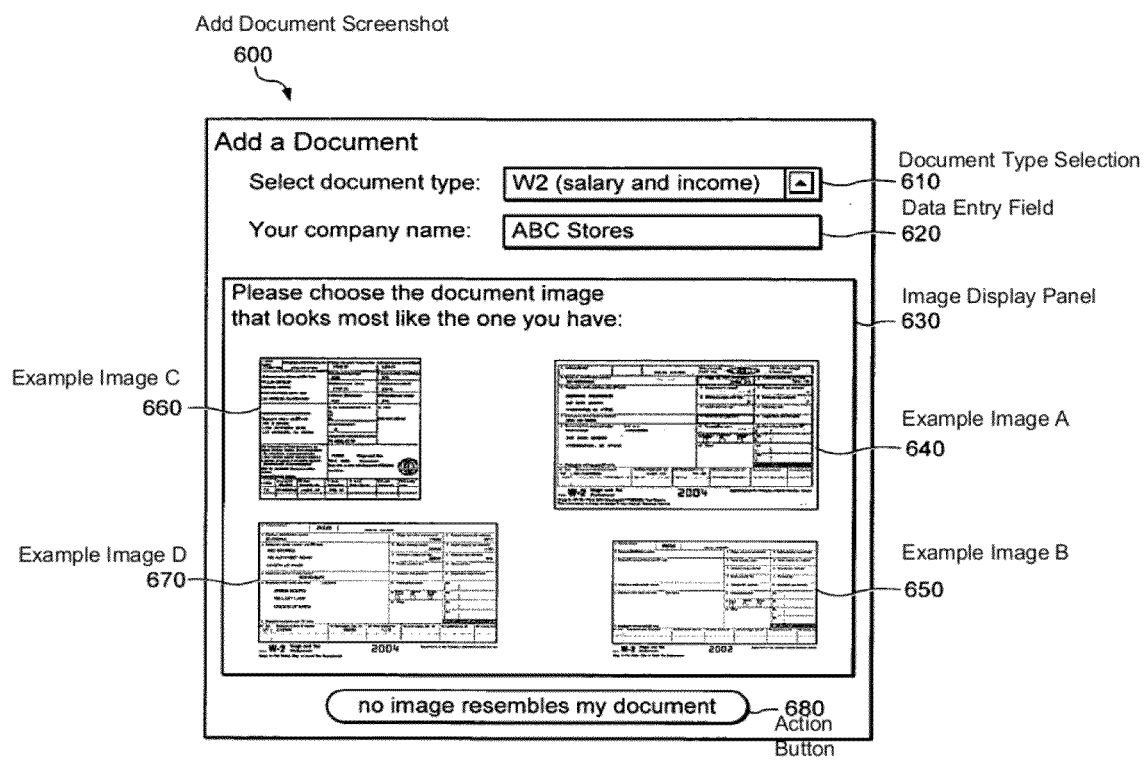
Figure 3F:
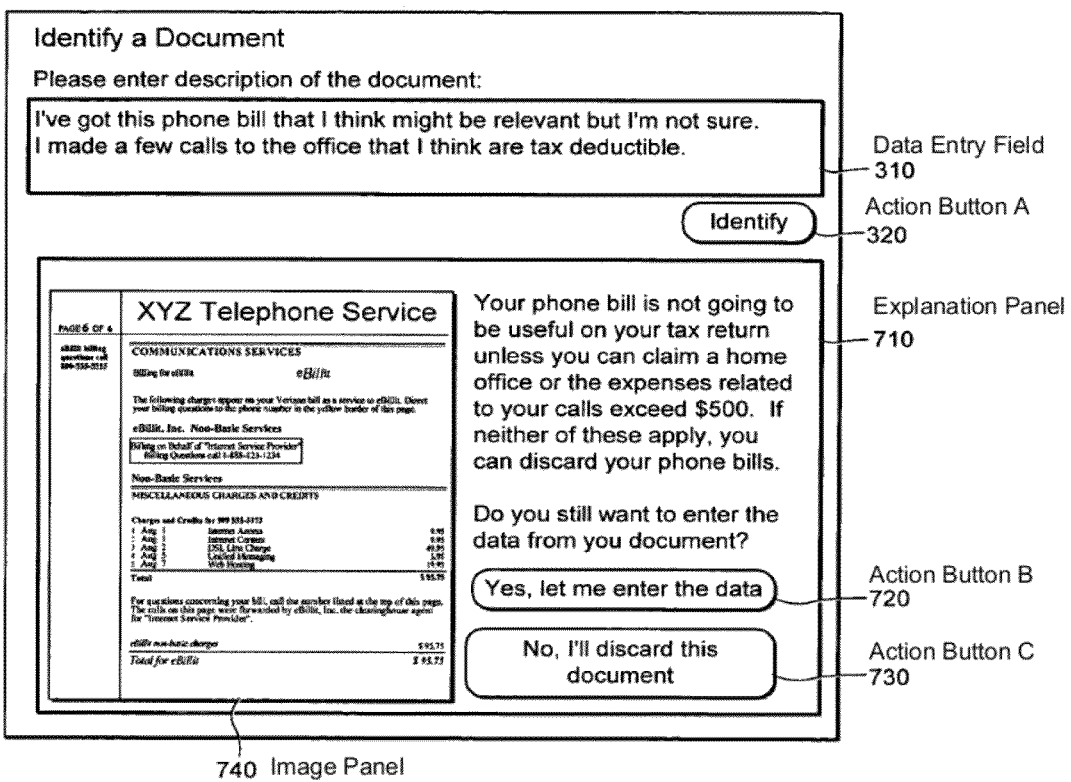

FIG. 3E shows an add document screenshot (600) including document type selection control (610) and additional user interface controls allowing the user to enter additional information regarding the user supplied document. For example, as illustrated in FIG. 3D, after the user selects a "W2" document type from document type selection control (610), data entry field (620) may be displayed to request the name of the business that provided the W2 statement. Based on the extra information supplied by the user, such as the name of the company providing a W2 statement, example images are displayed in image display panel (630).

In response to the user selecting a document type and possibly supplying additional information, example image A (640), example image B (650), example image C (660), and example image D (670) are displayed allowing the user to select an image that resembles the actual document thus identifying the user supplied document. In addition, the action button (680) allows the user to specify that none of the images resemble the actual document. In response to the user input specifying that none of the example images resemble the actual document, additional example images may be displayed for user selection. In the case where no more example images are available, the user may be requested to import a scanned image of the actual document; otherwise tax information collection may proceed without the aid of an example document image.

If provided, the newly added scanned image and user provided document type, perhaps after removal of the user's data, are added to a collection of example images for later use, such as for document identification and/or data entry. Additionally, the newly scanned image may be communicated to a remote computer adding to an increasingly large and robust repository of document example images.

As described above, after identifying a user's document, either via user selection of a document type or via automatic document identification, it is determined whether the document is appropriate tax return preparation. For example, when using tax return preparation software, a user may have documents that appear to be tax return related but which may not be relevant to the current tax return being prepared due to the taxpayer's individual situation. For instance, a taxpayer's phone bill may or may not be appropriate for data collection depending upon the nature of the current tax return, such as whether or not the taxpayer can claim a home office or based on the amount of expenses related to the phone calls.

FIG. 3F shows a document identification screenshot (700). In response to a user supplying a description of a document, such as via text entry field (310), and requesting the user supplied document to be automatically identified, such as via the action button A (320), it may be determined that the document is not appropriate for tax return data collection, as described above. In such a scenario, an explanation panel (710) of why the document was determined not to be appropriate for tax return data collection may also be displayed alongside either the actual scanned image of the document, if a scanned image of the document was received, or an example image of the type of document identified, such as in image panel (740). Additionally, action button B (720) and action button C (730) allows the user to choose to enter data from the document anyway or to discard the document and not enter any data from the document. For example, data may be collected for a document determined not to be appropriate for tax data collection if the user desires, such as in case the user thinks that the document will later be determined to be appropriate. For instance, since, the user is allowed to enter data for documents in any order, data or information collected later may change the determination as to whether a particular document is appropriate or relevant to a preparing the tax return. Thus, data may be collected for whatever documents the user decides to enter and then, after the user has finished entering data, the relevance of each document and/or piece of data may then be determined.

Figure 3G:
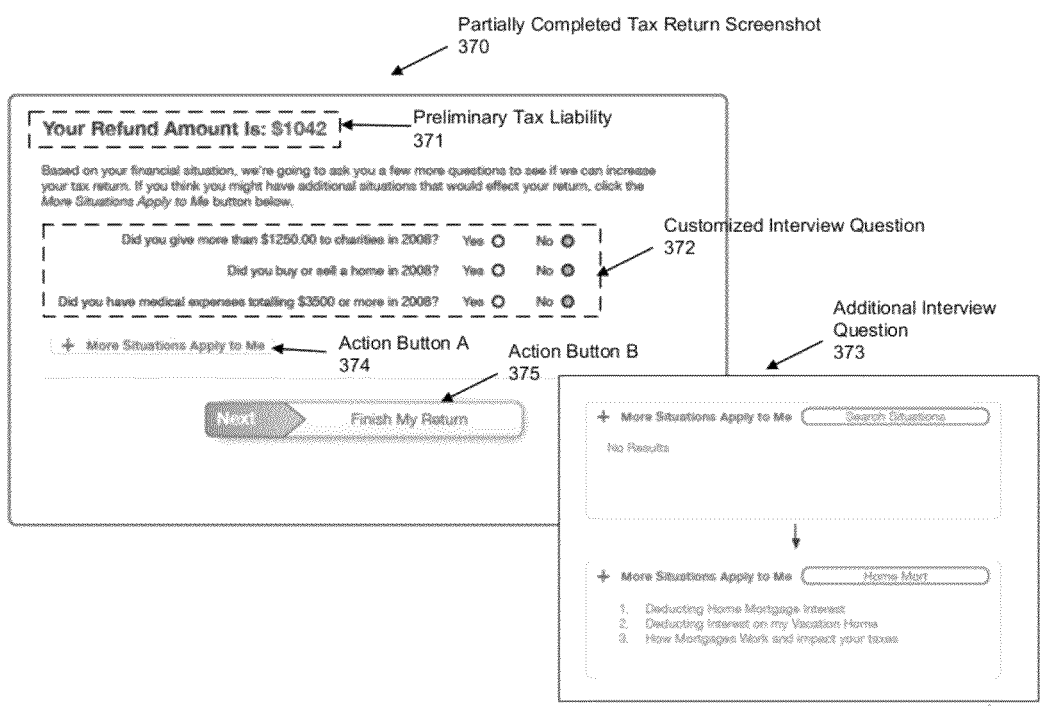
Figure 5:
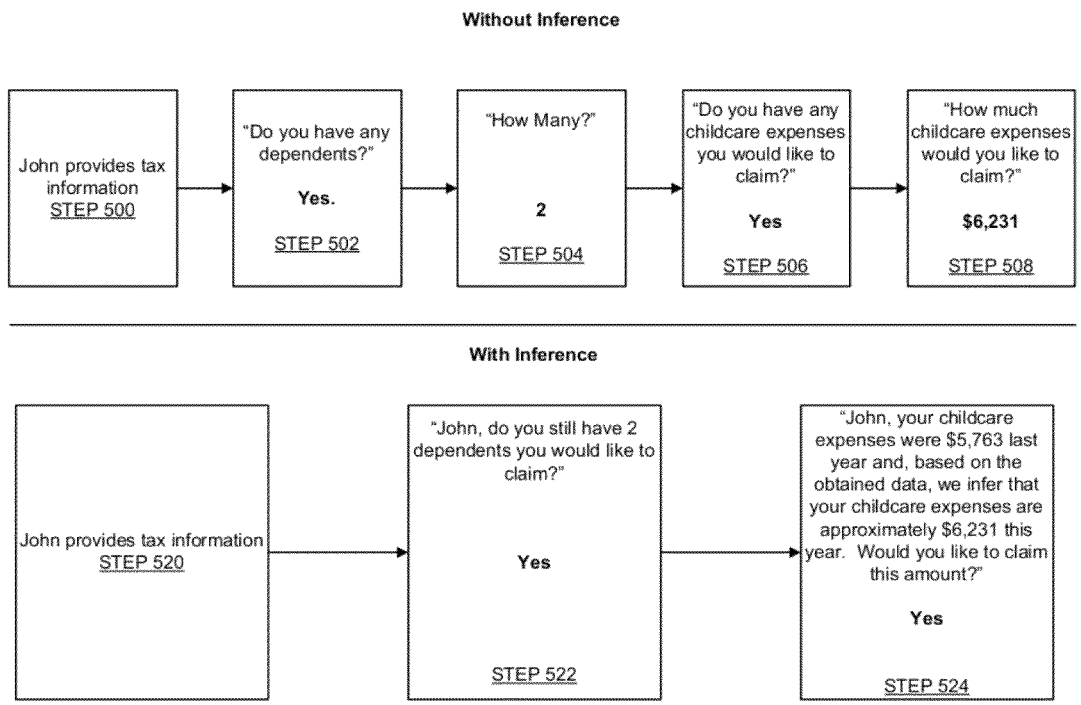
FIGS. 5 and 6 show examples in accordance with one or more embodiments of the invention.
Figure 6:
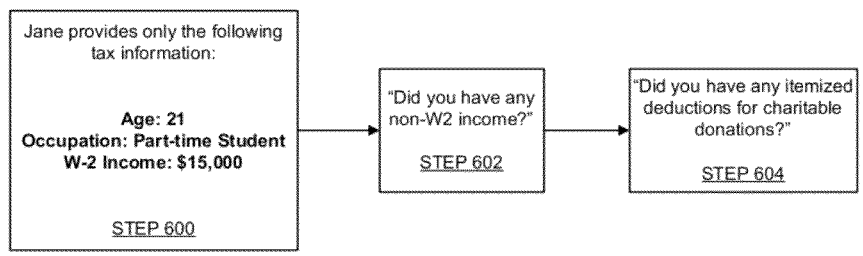
Figure 6:
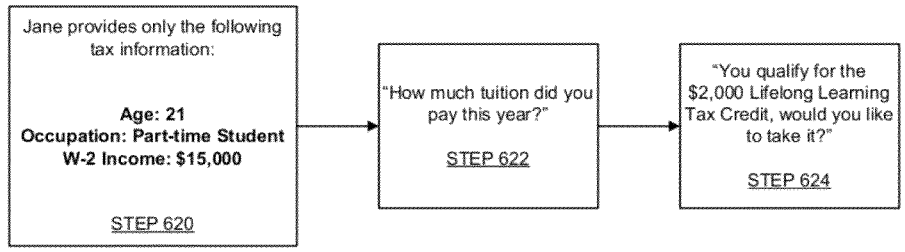

FIG. 3G shows a partially completed tax return screenshot (370). As described above, the partially completed tax return may be generated based on downloaded financial and tax document of the taxpayer and additional user supplied documents. In particular, the downloaded documents are obtained based on basic information provided by the user depicted in the screenshot (355) or a taxpayer profile based on such basic information obtained during preparation of prior year tax returns. Further, the additional user supplied documents are provided by the user without specific requirements of what document needed to be supplied or specific order in which each of the documents is provided. As shown in FIG. 3G, a preliminary tax liability (371) is presented to the user from the partially completed tax return. In addition, a list of customized interview questions (372) is also presented to the user. In some scenario where the user has very simple tax situation, the user may answer "no" to all of the customized interview questions and validate the partially completed tax return by clicking the action button B (375) to finish the tax return preparation, referred to as the instant tax return preparation because the tax return is prepared without a typically lengthy interview session. However, for those taxpayers having more a complicated tax situation, one or more "yes" answer to the customized interview question (372) may lead to additional interview question (373) to be presented to the user. Additional tax information is therefore obtained from the user. If the initial customized interview question (372) receives all "no" answer, the user has the option to manually request the additional interview question (372) by clicking the action button A (374). Accordingly, the partially completed tax return may be supplemented with the additional tax data obtained from the customized interview question (372) and the additional interview question (373), resulting in a fully completed tax return referred to as the prepared tax return. An example of customizing interview questions to obtain additional tax data for completing the tax return is illustrated in FIGS. 4-6 below.

FIG. 4 shows a weighting chart in accordance with one or more embodiments of the invention. It will be apparent to one of ordinary skill in the art that there are many potential ways to determine confidence/relevance weightings of data/questions and as such, the invention should not be limited to the following examples. The weighting chart (400) shows a tax return (402) broken into a variety of sub-parts, including income (404), deductions (406), personal info (408), and tax advice (410). As can be seen in FIG. 4, various components show a weight attached to the tax data item provided through an answer (based on the confidence in the accuracy and validity of the answer) and a weight attached to the interview questions (based on the relevancy of the interview questions). The data provided through answers include the IBM W-2 (412) with a weight of +0.9, the boxes from within the IBM W-2 (414) with a weight of 0, and the data from the Chase 1098 (416) with a weigh of +1. The questions include the W-2 question (418) with a weight of +0.9, the 1099 question (420) with a weight of 0, the Own a home question (422) with a weight of +1, the Mortgage Interest question (424) with a weight of +1, and the Property Taxes question (426) with a weight of +0.9.

As discussed above, the weighting of the tax data items depends on the confidence in the accuracy and validity of the tax data items in accordance with one or more embodiments of the invention. In one or more embodiments of the invention, the confidence in the accuracy and validity of a tax data item is represented as confidence level of the tax data item. Accordingly, the IBM W-2 answer (412), which is verified from a prior tax return, is afforded a weight of +0.9 even though it is entered by the taxpayer. However, the boxes from within the IBM W-2 (414) is afforded a weight of 0 because the data was simply entered by the taxpayer and not given significant weight. The tax data item from the Chase 1098 (416) is given a weighting of +1 because the data is obtained directly from the financial institution. Based on the weighting of the tax data items, the tax data item(s) may then be used (or not used) to populate one or more tax forms, for example, in the partially completed tax return. An example method to further determine the confidence levels of data items in the partially completed tax return are described in copending U.S. patent application Ser. No. 11/700,580, filed on Jan. 30, 2007, and entitled "MECHANISM FOR INDICATING AND RESOLVING THE TRUST LEVEL OF INFORMATION" as well as copending U.S. patent application Ser. No. 11/700,287, filed on Jan. 30, 2007, and entitled "COMMUNITY TO SUPPORT THE DEFINITION AND SHARING OF SOURCE TRUST LEVEL CONFIGURATIONS" both of which are also assigned to the assignee of the present application and incorporated herein by reference.

As also discussed above, the weighting of the questions depend on the relevancy of the question in light of the personal info (not shown) and other information found in the current tax return (e.g., the partially completed tax return described in reference to FIGS. 3A-3G above) or prior tax returns. In this example, the "Own a home?" question (422) is afforded a weight of +1 based on a prior year tax return (and possibly personal info) or the partially completed tax return, and likewise the Mortgage Interest question (424) is afforded a weight of +1 based on prior year returns or the partially completed tax return and the fact that a 1098 tax form from the financial institution was downloaded. However, the Property Taxes question (426) is afforded a weight of +0.9 based on prior year tax returns or the partially completed tax return having property taxes paid, but no further supporting information (such as a tax statement downloaded from the county or personal information entered by the user). Similarly, the 1099 question (420) is afforded a weight of 0 since nothing indicates the question is relevant for this tax return.

Further, a question to confirm or clarify a tax data item may be assigned a high relevance weighting if the tax data item has a low confidence level. For example, example confidence level definitions of data items obtained from a data source and derived confidence level calculated therefrom are described in the aforementioned copending applications. Specifically, confidence levels of data items obtained from various data sources (e.g., described in reference to FIG. 3A above) and derived confidence levels of one or more calculated data items based thereon in the partially completed tax return may be compared to a pre-determined threshold. Accordingly, a confirmation or clarification question may be generated in response to the comparison indicating the confidence level being below the pre-determined threshold. In one or more embodiments, the relevance weighting of such a confirmation or clarification question may be determined based on the difference between the confidence level and the pre-determined threshold. For example, the smaller the difference is to the pre-determined threshold, the lower the relevance weighting will be. Conversely, the larger the difference is to the pre-determined threshold, the higher the relevance weighting will be. Based on the relevance weighting of the questions, the question may then be selected to be used (or not used) as an interview question while trying to further populate one or more tax forms in the partially completed tax return. In one or more embodiments, an additional tax data item obtained from such interview questions may be added to a tax form in the partially completed tax return. Accordingly and in one or more recursive iteration, a confidence level of such added additional tax data item is calculated and further relied upon in determining relevance weightings of aforementioned questions and/or in generating additional confirmation/clarification questions.

In one or more embodiments, the partially completed tax return is expanded into the completed tax return (e.g., described in reference to FIG. 3A above) in response to no more interview questions being selected or generated in one or more recursive iterations.

FIGS. 5 and 6 show examples in accordance with one or more embodiments of the invention. Specifically, FIG. 5 shows one example of how an interview question may be personalized to a user. FIG. 6 shows how interview questions may be prioritized to a user. It will be apparent to one of ordinary skill in the art that there are many potential ways to personalize, prioritize, and/or infer and, as such, the invention should not be limited to the following examples.

FIG. 5 shows how, in one or more embodiments of the invention, a tax preparation application may ask personalized questions about dependents. A line of follow-up interview questioning is shown both with inference (Steps 500-508) and without inference (Steps 520-524) to provide a comparison that may be used to better understand the invention.

Initially, in Step 500, John provides tax information. In one or more embodiments of the invention, as described above, the tax information is obtained from a variety of sources including, but not limited to, a government agency, financial institution, employer, payroll company, stockbroker, previous tax return, receipts, credit card statements, bills, invoices, charitable contribution donation records, documents obtained through OCR techniques, documents obtain through screen scraping of websites, and/or any other supplier or source of tax data. Alternatively, John may enter the tax information manually. For the purposes of this example, assume that the information provided was not complete with regards to dependents, and thus John must answer questions to complete that section of his tax return.

In Step 502, because inferences are not used, John is asked the same question as every other user of the tax preparation application, "Do you have any dependents?" to which he answers "Yes." John is then prompted to answer "How Many" dependents he has, to which he responds "2" (Step 504). The pre-defined, linear questioning continues in Step 506 asking, "Do you have any childcare expenses you would like to claim?" with John responding "Yes." Finally, the last question, "How much childcare expenses would you like to claim?" allows John to enter his answer of $6,231 (Step 508). It will be apparent to one of ordinary skill in the art that Steps 500-508 show a generic, linear process without inference(s) that each user of the tax preparation application views and must go through in order to prepare a tax return. Further, it will also be apparent to one of ordinary skill in the art that Steps 500-508 place the majority of the burden of collecting data about the user on the user.

In contrast, Steps 520-524 show the same line of questioning as Steps 500-508; however, inferences are now used, thereby streamlining the process and greatly reducing the burden of collecting data. In Step 520, John collects his information. For the purposes of this example, John collects his information exactly as he does in Step 400, including that the information provided is incomplete with regard to the dependents.

In Step 522, inferences are made, and the question asked to John is, "John, do you still have 2 dependents you would like to claim?" John's response is "Yes." In one or more embodiments of the invention, the inferences may have been made by an inference engine applying inference rules to the information provided by John. Specifically, the inference made in Step 522 may be that, because John had 2 dependents on the prior year's tax return, he is likely to have 2 dependents for this year's tax return as well. In one or more embodiments of the invention associated with John's dependents was pre-populated for John in his tax return, and merely needed his validation. It will be apparent to one of ordinary skill in the art that this is only one example of the inferences that may be made and, as such, the invention should not be limited to the above example. Additionally, the question in Step 522 has also been personalized to John. For example, the question uses his name, and instead of just inquiring whether John has any dependents, the inference reflecting that John has 2 dependents is also found in the question Next, in Step 524, John is asked, "John, your childcare expenses were $5,763 last year and, based on the obtained data, we infer that your childcare expenses are approximately $6,231 this year. Would you like to claim this amount?" to which John answers "Yes." As in the previous step, inferences may have been made by applying inference rules to the tax information provided by John. Specifically, the inference made is that John's childcare expenses are $6,231. In one or more embodiments of the invention, this number may be derived from data received in Step 520 that is not "traditional" tax data, such as credit card statements or other financial information. For example, credit card statements may be processed to identify purchases that are likely related to childcare expenses, and the identified purchases may be added together to get the estimated childcare expenses. Alternatively, last year's childcare deduction may be multiplied by the increase in the consumer price index over the year to infer the current year childcare expenses, or any other suitable process may be used. It will be apparent to one of ordinary skill in the art that there are many ways to make an inference and, as such, the invention should not be limited to the above examples.

FIG. 6 shows how, in one or more embodiments of the invention, questions may be prioritized based on relevancy to the user. Like FIG. 5, FIG. 6 shows a line of questioning with and without inference to provide a comparison that may be used to better understand the present invention. Steps 600-604 show the "default" line of questioning for a tax preparation application (i.e., without inference), while Steps 620-624 show a line of question for a tax preparation application using inference.

Initially, in Step 600, Jane provides only three pieces of information to the tax preparation application, namely that she is 21, a part-time student, and had an income of $15,000 this tax year. It will be apparent to one of ordinary skill in the art that much more information is required to complete a tax return. In Step 602, the tax preparation application, without using inference, continues on its standard, linear path of questioning that each user of a tax preparation application sees. In this example, the first question asked is, "Did you have any non-W2 income?" More likely than not, Jane does not have any non-W2 income, as she is 21 years old and a part time student. However, because the tax preparation application in Steps 600-604 does not use inference, Jane is forced to follow the standard path and answer many questions that are completely irrelevant to her situation. Next, the standard, linear questioning continues at Step 604 asking, "Did you have any itemized deductions for charitable donations?" As in the previous step, an itemized deduction for charitable donations are, more likely than not, irrelevant to the situation of a 21 year old part-time student. It will be apparent to one of ordinary skill in the art that, while the example questions of Steps 602 and 604 may be relevant to some individuals in Jane's situation, there are other significantly more relevant questions that ideally would be asked first.

In contrast, Step 620-624 show the same process as Steps 500-504, but inferences are used. Initially, in Step 620, Jane provides the same three pieces of information to the tax preparation application as provided in Step 600, namely that she is 21, a part-time student, and had an income of $15,000 this tax year. In one or more embodiments of the invention, as soon as Jane enters this information, inferences are made based on the obtained information. Inferences may include, but are not limited to, inferring missing tax data, personalizing interview questions, prioritizing interview questions, providing warnings, providing tax advice, populating tax returns, and/or any other relevant aspect. For this example, the inference is prioritizing the ordering of the interview questions asked of Jane. Based on the information entered and by applying inference rules, the tax preparation application Jane is using determines the most relevant question to Jane is, "How much tuition did you pay this year?" (Step 622). In one or more embodiments of the invention, the question in Step 622 may be the question with the highest weight after inference rules are applied.

After Jane enters her answer, the tax preparation application re-applies the inference rules to the entered information (Step 624). This time, the highest weight is for a piece of tax advice, telling Jane that, "You qualify for the $2,000 Lifelong Learning Credit, would you like to take it?" Obviously this is another highly relevant question to Jane's particular situation, and makes the user feel as though the tax preparation application is really aware of his or her actual situation.

Figure 7:
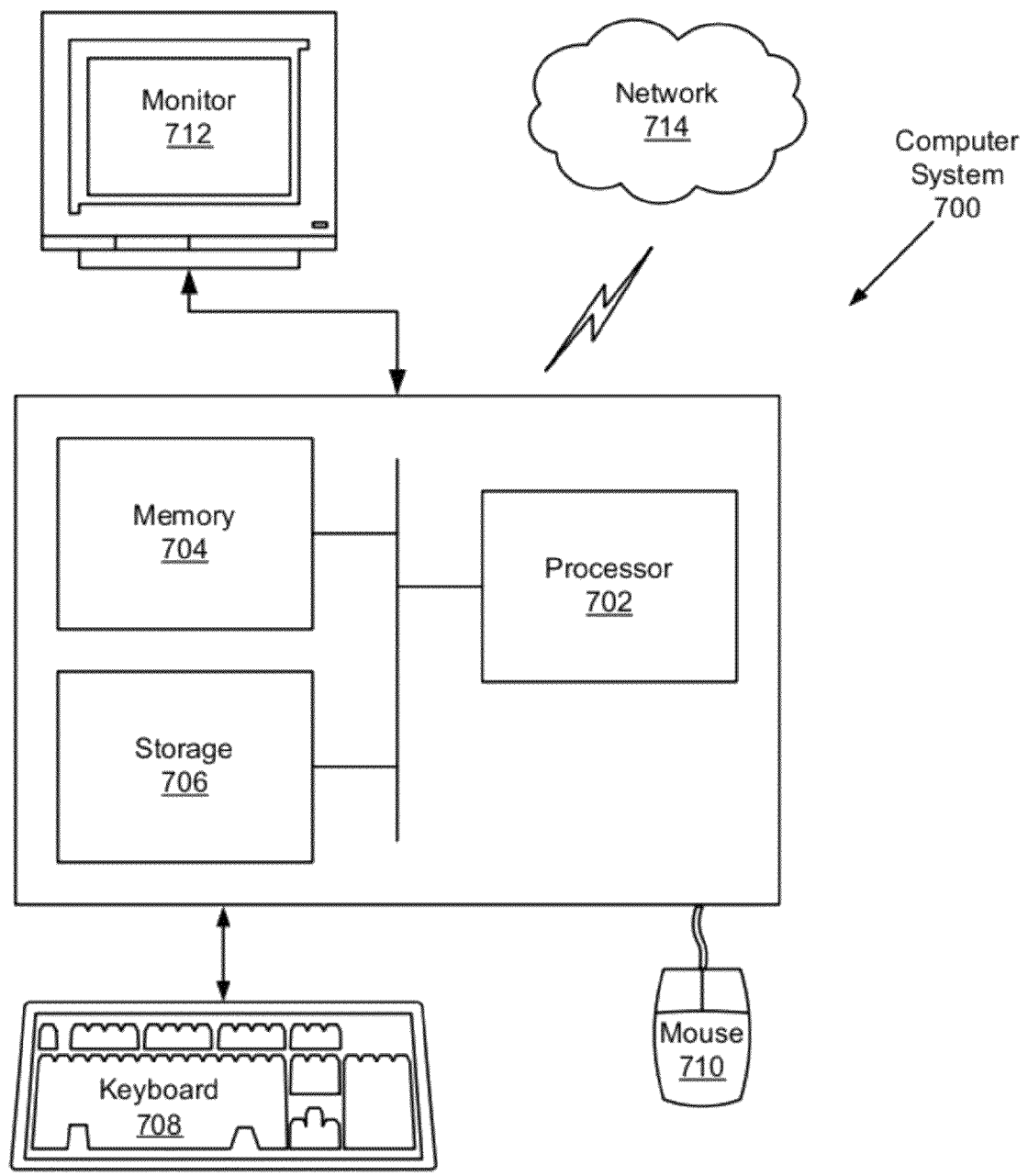
FIG. 7 shows a diagram of a computer in accordance with one or more embodiments of the invention.

One or more embodiments of the invention may be implemented on virtually any type of computer regardless of the platform being used. For example, as shown in FIG. 7, a computer system (700) includes a processor(s) (702) (such as an integrated circuit, central processing unit (CPU)), associated memory (704), a storage device(s) (706), and numerous other elements and functionalities typical of today's computers (not shown). The computer system (700) may also include input means, such as one or more input device(s) (708), and output means, such as one or more display(s) (712). The input device(s) (708) may include, for example, a keyboard, a mouse, a touch screen, a microphone, and/or any other suitable device for receiving input. The display(s) (712) may include, for example, a monitor, a touch screen, a Liquid Crystal Display (LCD) screen, and/or any other suitable method for displaying output. The computer system (700) is connected to a local area network (LAN) or a wide area network (e.g., the Internet) (714) via a network interface connection (not shown). Those skilled in the art will appreciate that these input and output means may take other forms. Additionally, in one or more embodiments of the invention, the computer system (700) may be a mobile device such as a laptop, mobile phone, smart phone, Personal Digital Assistant (PDA), or any other suitable device.

Further, those skilled in the art will appreciate that one or more elements of the aforementioned computer system (700) may be located at a remote location and connected to the other elements over a network (714). Further, one or more embodiments of the invention may be implemented on a distributed system having one or more nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a non-transitory computer readable storage medium such as a compact disc (CD), a diskette, a tape, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for preparing a tax return for a user, comprising:
   collecting tax data items without user intervention by:
      identifying, using a processor of a computer system and by applying a plurality of inference rules based on information of the user, a first document and an entity configured to maintain the first document;
      identifying an access mechanism for accessing the first document from the entity and obtaining a downloaded copy of the first document based on the access mechanism;
      retrieving, using the processor, a first tax data item from the first document by applying the plurality of inference rules based on the downloaded copy;
      obtaining a scanned image of a second document; and
      retrieving, using the processor, a second tax data item from the second document
   by applying the plurality of inference rules based on the scanned image; generating, using the processor, a partially completed tax return by populating a tax form of the tax return using the first and second tax data items and calculating a preliminary tax liability therefrom; and
   displaying the partially completed tax return comprising the preliminary tax liability to the user.

2. The method of claim 1, further comprising:
   identifying a document template based on an identity of the first document,
   wherein retrieving the first tax data item from the first document comprises using optical character recognition based on the document template.

3. The method of claim 1, further comprising:
   receiving a user input comprising the information of the user;
   obtaining access credentials to a user account at the entity from the user, wherein the access mechanism comprises the access credentials; and
   storing an identity of the first document and the access credentials in a user profile for preparation of a tax return for a subsequent tax year.

4. The method of claim 1,
   wherein access credentials to a user account at the entity were obtained from the user and saved in a user profile during preparation of a prior year tax return,
   wherein the access mechanism comprises the access credentials, and
   wherein the first document is identified based on the user profile.

5. The method of claim 1, further comprising:
   displaying a user selection menu comprising at least one selected from a group consisting of a list of document types and a plurality of images of example documents;
   receiving a user selection from the user selection menu;
   determining an identity of the second document based on the user selection; and
   identifying a document template based on the identity of the second document, wherein retrieving the second tax data item from the second document comprises using optical character recognition based on the document template.

6. The method of claim 1, further comprising:
generating an inferred tax data item from the first and second tax data items; and further generating the partially completed tax return by further populating the tax form using the inferred tax data item and further calculating the preliminary tax liability therefrom.

7. The method of claim 6, wherein generating the inferred tax data item comprises inferring an identity of a primary taxpayer and an identity of a secondary taxpayer from the tax document.

8. The method of claim 6,
wherein the first document is a credit card statement,
wherein generating the inferred tax data item comprises inferring a medical expense from the credit card statement, and
wherein inferring comprises summing a plurality of transactions in the credit card statement corresponding to medical purchases.

9. The method of claim 1, further comprising:
assigning, using the processor, relevance ratings to a plurality of interview questions by applying a plurality of inference rules based on the partially completed tax return;
prompting the user with at least one of the plurality of interview questions identified based on the relevance ratings, wherein the at least one interview question is personalized by altering a
wording of the at least one interview question based on information found on the first and second documents;
receiving an answer to the interview question from the user;
generating, using the processor, a prepared tax return based on the answer; and
displaying the prepared tax return to the user.

10. The method of claim 9,
wherein the answer comprises an additional tax data item, and
wherein generating the prepared tax return based on the answer comprises further populating the tax form using the additional tax data item and further calculating the preliminary tax liability to generate a finalized tax liability therefrom.

11. The method of claim 9,
wherein the answer comprises a confirmation, and
wherein generating the prepared tax return based on the answer comprises adjusting the partially completed tax return based on the confirmation.

12. The method of claim 9, further comprising:
receiving validation of the prepared tax return from the user; and
filing the prepared tax return electronically.

13. A system for preparing a tax return for a user, comprising:
a memory and a processor, operatively connected to the memory;
a tax inference engine executing on the processor without user intervention and configured to:
identify, by applying a plurality of inference rules based on information of the user, a first document and an entity configured to maintain the first document,
receive a downloaded copy of the first document,
retrieve a first tax data item from the first document by applying the plurality of inference rules based on the downloaded copy,
receive a scanned image of a second document, and
retrieve a second tax data item from the second document by applying the plurality of inference rules based on the scanned image;
a data import service executing on the processor without user intervention and configured to:
identify access mechanism for accessing the first document from the entity,
obtain the downloaded copy of the first document based on the access mechanism for sending to the tax inference engine, and
obtain the scanned image of the second document for sending to the tax inference engine, and
a tax preparation application executing on the processor and configured to:
generate a partially completed tax return by populating a tax form of the tax return using the first and second tax data items and calculating a preliminary tax liability therefrom, and
display the partially completed tax return comprising the preliminary tax liability to the user.

14. The system of claim 13, wherein the tax inference engine is further configured to:
identify a document template based on an identity of the first document,
wherein retrieving the first tax data item from the first document comprises using optical character recognition based on the document template.

15. The system of claim 13, wherein the tax inference engine is further configured to:
display a user selection menu comprising at least one selected from a group consisting of a list of document types and a plurality of images of example documents;
receive a user selection from the user selection menu;
determine an identity of the second document based on the user selection; and
identify a document template based on the identity of the second document,
wherein retrieving the second tax data item from the scanned image comprises using optical character recognition based on the document template.

16. The system of claim 13, wherein applying the plurality of inference rules comprises inferring an identity of a primary taxpayer and an identity of a secondary taxpayer from a tax document.

17. The system of claim 13, wherein applying the plurality of inference rules comprises summing a plurality of transactions in a credit card statement corresponding to medical purchases.

18. The system of claim 13,
wherein the tax inference engine is further configured to:
assign relevance ratings to a plurality of interview questions by applying the plurality of inference rules based on the partially completed tax return;
identify at least one of the plurality of interview questions based on the relevance ratings; and
personalize the at the least one interview question by altering a wording of the at least one interview question based on information found on the first and second documents, and
wherein the tax preparation application is further configured to:
prompt the user with the at the least one interview question;
receive an answer to the interview question from the user;

generate a prepared tax return based on the answer; and
display the prepared tax return to the user.

19. The system of claim 18,
wherein the answer comprises an additional tax data item, and wherein generating the prepared tax return based on the answer comprises further populating the tax form using the additional tax data item and further calculating the preliminary tax liability to generate a finalized tax liability therefrom.

20. The system of claim 18,
wherein the answer comprises a confirmation, and
wherein generating the prepared tax return based on the answer comprises adjusting the partially completed tax return based on the confirmation.

21. The system of claim 13, further comprising:
an e-file service configured to:
receive validation of the prepared tax return from the user, and
file the prepared tax return electronically.

22. A computer readable storage medium comprising computer executable instructions for preparing a tax return for a user, the instructions when executed by a processor comprising functionality for:
collecting tax data items without user intervention by:
identifying, by applying a plurality of inference rules based on information of the user, a first document and an entity configured to maintain the first document;
identifying an access mechanism for accessing the first document from the entity and obtaining a downloaded copy of the first document based on the access mechanism;
retrieving a first tax data item from the first document by applying the plurality of inference rules based on the downloaded copy;
obtaining a scanned image of a second document; and
retrieving a second tax data item from the second document by applying the plurality of inference rules based on the scanned image;
generating a partially completed tax return by populating a tax form of the tax return using the first and second tax data items and calculating a preliminary tax liability therefrom; and
displaying the partially completed tax return comprising the preliminary tax liability to the user.

23. The computer readable storage medium of claim 22, the instructions when executed by a processor further comprising functionality for:
identifying a document template based on an identity of the first document,
wherein retrieving the first tax data item from the first document comprises using optical character recognition based on the document template.

24. The computer readable storage medium of claim 22, the instructions when executed by a processor further comprising functionality for:
receiving a user input comprising the information of the user;
obtaining access credentials to a user account at the entity from the user, wherein the access mechanism comprises the access credentials; and
storing an identity of the first document and the access credentials in a user profile for preparation of a tax return for a subsequent tax year.

25. The computer readable storage medium of claim 22,
wherein access credentials to a user account at the entity were obtained from the user and saved in a user profile during preparation of a prior year tax return,
wherein the access mechanism comprises the access credentials, and
wherein the first document is identified based on the user profile.

26. The computer readable storage medium of claim 22, the instructions when executed by a processor further comprising functionality for:
displaying a user selection menu comprising at least one selected from a group consisting of a list of document types and a plurality of images of example documents;
receiving a user selection from the user selection menu;
determining an identity of the second document based on the user selection; and
identifying a document template based on the identity of the second document,
wherein retrieving the second tax data item from the second document comprises using optical character recognition based on the document template.

27. The computer readable storage medium of claim 22, the instructions when executed by a processor further comprising functionality for:
generating an inferred tax data item from the first and second tax data items; and
further generating the partially completed tax return by further populating the tax form using the inferred tax data item and further calculating the preliminary tax liability therefrom.

28. The computer readable storage medium of claim 27, wherein generating the inferred tax data item comprises inferring an identity of a primary taxpayer and an identity of a secondary taxpayer from the tax document.

29. The computer readable storage medium of claim 27,
wherein the first document is a credit card statement,
wherein generating the inferred tax data item comprises inferring a medical expense from the credit card statement, and
wherein inferring comprises summing a plurality of transactions in the credit card statement corresponding to medical purchases.

30. The computer readable storage medium of claim 22, the instructions when executed by a processor further comprising functionality for:
assigning, using the processor, relevance ratings to a plurality of interview questions by applying
a plurality of inference rules based on the partially completed tax return;
prompting the user with at least one of the plurality of interview questions identified based on the relevance ratings, wherein the at least one interview question is personalized by altering a
wording of the at least one interview question based on information found on the first and second documents;
receiving an answer to the interview question from the user;
generating, using the processor, a prepared tax return based on the answer; and displaying the prepared tax return to the user.

31. The computer readable storage medium of claim 30,
wherein the answer comprises an additional tax data item, and
wherein generating the prepared tax return based on the answer comprises further populating the tax form using the additional tax data item and further calculating the preliminary tax liability to generate a finalized tax liability therefrom.

32. The computer readable storage medium of claim 30,
wherein the answer comprises a confirmation, and wherein generating the prepared tax return based on the answer comprises adjusting the partially completed tax return based on the confirmation.

33. The computer readable storage medium of claim 30, the instructions when executed by a processor further comprising functionality for:

receiving validation of the prepared tax return from the user; and filing the prepared tax return electronically.

* * * * *